US010143317B2

(12) United States Patent
Jensen

(10) Patent No.: US 10,143,317 B2
(45) Date of Patent: Dec. 4, 2018

(54) CUSHIONS

(71) Applicant: Gemma Jensen, Altrincham (GB)

(72) Inventor: Gemma Jensen, Altrincham (GB)

( * ) Notice: Subject to any disclaimer, the term of this patent is extended or adjusted under 35 U.S.C. 154(b) by 0 days.

(21) Appl. No.: 15/722,596

(22) Filed: Oct. 2, 2017

(65) Prior Publication Data

US 2018/0055253 A1   Mar. 1, 2018

Related U.S. Application Data

(63) Continuation of application No. 14/363,727, filed as application No. PCT/GB2012/053062 on Dec. 7, 2012, now Pat. No. 9,808,100.

(30) Foreign Application Priority Data

Dec. 9, 2011  (GB) .................................. 1121215.6
May 4, 2012  (GB) .................................. 1208001.6

(51) Int. Cl.
  *A47G 9/10*   (2006.01)
  *A47C 7/38*   (2006.01)
  *A47C 27/08*  (2006.01)
  *B60N 2/882*  (2018.01)

(52) U.S. Cl.
  CPC ............ *A47G 9/1081* (2013.01); *A47C 7/383* (2013.01); *A47C 27/086* (2013.01); *B60N 2/882* (2018.02); *A47G 2009/1018* (2013.01)

(58) Field of Classification Search
  CPC .. A47C 7/383; A47G 2009/1018; A47G 9/10; A47G 9/1009; A47G 9/1027; A47G 9/1036; A47G 9/1045; A47G 9/1063; A47G 9/1072; A47G 9/1081; A47G 9/109; A47G 9/1054; A61G 13/121; A61G 7/072

USPC .......................................................... D6/601
See application file for complete search history.

(56) References Cited

U.S. PATENT DOCUMENTS

| | | | |
|---|---|---|---|
| D201,492 S  * | 6/1965 | Jacobson ....................... D6/601 |
| 4,565,408 A | 1/1986 | Palley |
| 4,617,691 A | 10/1986 | Monti et al. |
| 4,679,262 A | 7/1987 | Davis et al. |
| 4,738,488 A | 4/1988 | Camelio |
| 5,064,245 A  * | 11/1991 | Stephens ................ A47C 7/383 |
| | | | 297/391 |
| 5,785,388 A | 7/1998 | Curtis |

(Continued)

FOREIGN PATENT DOCUMENTS

| CN | 2105903 U | 6/1992 |
|---|---|---|
| CN | 201577930 U | 9/2010 |

(Continued)

*Primary Examiner* — Eric J Kurilla
(74) *Attorney, Agent, or Firm* — Egbert Law Offices, PLLC

(57) ABSTRACT

A cushion including a pillow portion useable for supporting the head of a user of the cushion and an elongate trunk portion that extends away from the pillow portion and which is usable for supporting the chin of the user. Wherein the pillow portion is shaped so that it is useable to extend from at least a position on the back of the neck of a user whose head is being supported by the pillow portion that is less than three centimeters from the mid-point of the back of the neck to at least a position where it contacts an ear of the user, and wherein in this use of the pillow portion the trunk portion extends away from the pillow portion towards the chin of the user.

24 Claims, 25 Drawing Sheets

(56) References Cited

U.S. PATENT DOCUMENTS

| | | | |
|---|---|---|---|
| 5,987,674 A | 11/1999 | Schaffner et al. | |
| 6,230,349 B1 | 5/2001 | Silver et al. | |
| 6,231,535 B1 | 5/2001 | Mainiero et al. | |
| 6,289,538 B1 | 9/2001 | Fidge | |
| 6,651,256 B1 | 11/2003 | Swift | |
| 6,973,691 B1 * | 12/2005 | Cordova | A47C 7/383 |
| | | | 248/118 |
| 7,146,665 B1 | 12/2006 | Moorin | |
| 7,322,061 B2 | 1/2008 | Carroll | |
| 7,513,001 B1 | 4/2009 | Leach | |
| 7,958,582 B1 | 6/2011 | Scamardo | |
| D663,150 S * | 7/2012 | Oberpriller | D6/601 |
| 8,756,734 B1 * | 6/2014 | Ortega | A47G 9/10 |
| | | | 5/490 |
| D721,520 S * | 1/2015 | Jensen | D6/601 |
| 2002/0043859 A1 | 4/2002 | Smith | |
| 2003/0038520 A1 | 2/2003 | Marbutt | |
| 2003/0038521 A1 | 2/2003 | Johnson | |
| 2004/0045087 A1 * | 3/2004 | Morris | A47C 20/021 |
| | | | 5/632 |
| 2004/0155158 A1 | 8/2004 | Cuddy | |
| 2005/0028284 A1 | 2/2005 | Gartrell et al. | |
| 2005/0229316 A1 * | 10/2005 | Liao | A47G 9/1045 |
| | | | 5/639 |
| 2005/0273935 A1 | 12/2005 | Cordova | |
| 2006/0042012 A1 | 3/2006 | Littlehorn | |
| 2006/0162080 A1 | 7/2006 | Littlehorn et al. | |
| 2007/0067914 A1 | 3/2007 | Littlehorn et al. | |
| 2007/0209115 A1 | 9/2007 | Carroll | |
| 2009/0205136 A1 | 8/2009 | Mittelstadt | |
| 2009/0206646 A1 | 8/2009 | Mittelstadt | |
| 2010/0299838 A1 | 12/2010 | Lanci | |
| 2012/0313417 A1 * | 12/2012 | Hurwitz | A47C 7/383 |
| | | | 297/391 |
| 2015/0040320 A1 * | 2/2015 | Gibbons | A47C 20/025 |
| | | | 5/632 |

FOREIGN PATENT DOCUMENTS

| | | |
|---|---|---|
| CN | 201831438 U | 5/2011 |
| DE | 76325 C | 11/1892 |
| DE | 2135425 A1 | 1/1973 |
| GB | 2313050 A | 11/1997 |
| GB | 2440257 A | 1/2008 |
| GB | 2510703 A | 8/2014 |
| JP | S48-15660 A | 5/1973 |
| JP | S61-147055 U | 9/1986 |
| JP | 3055547 U | 1/1999 |
| JP | 2000508208 A | 7/2000 |
| JP | 2000217686 A | 8/2000 |
| JP | 2004275571 A | 10/2004 |
| JP | 2006-043393 A | 2/2006 |
| JP | 2006-288533 | 10/2006 |
| KR | 20030010064 A | 2/2003 |
| WO | 2007062460 A1 | 6/2007 |
| WO | 2007103452 A2 | 9/2007 |
| WO | 2011089581 A1 | 7/2011 |
| WO | 2012171121 A1 | 12/2012 |

* cited by examiner

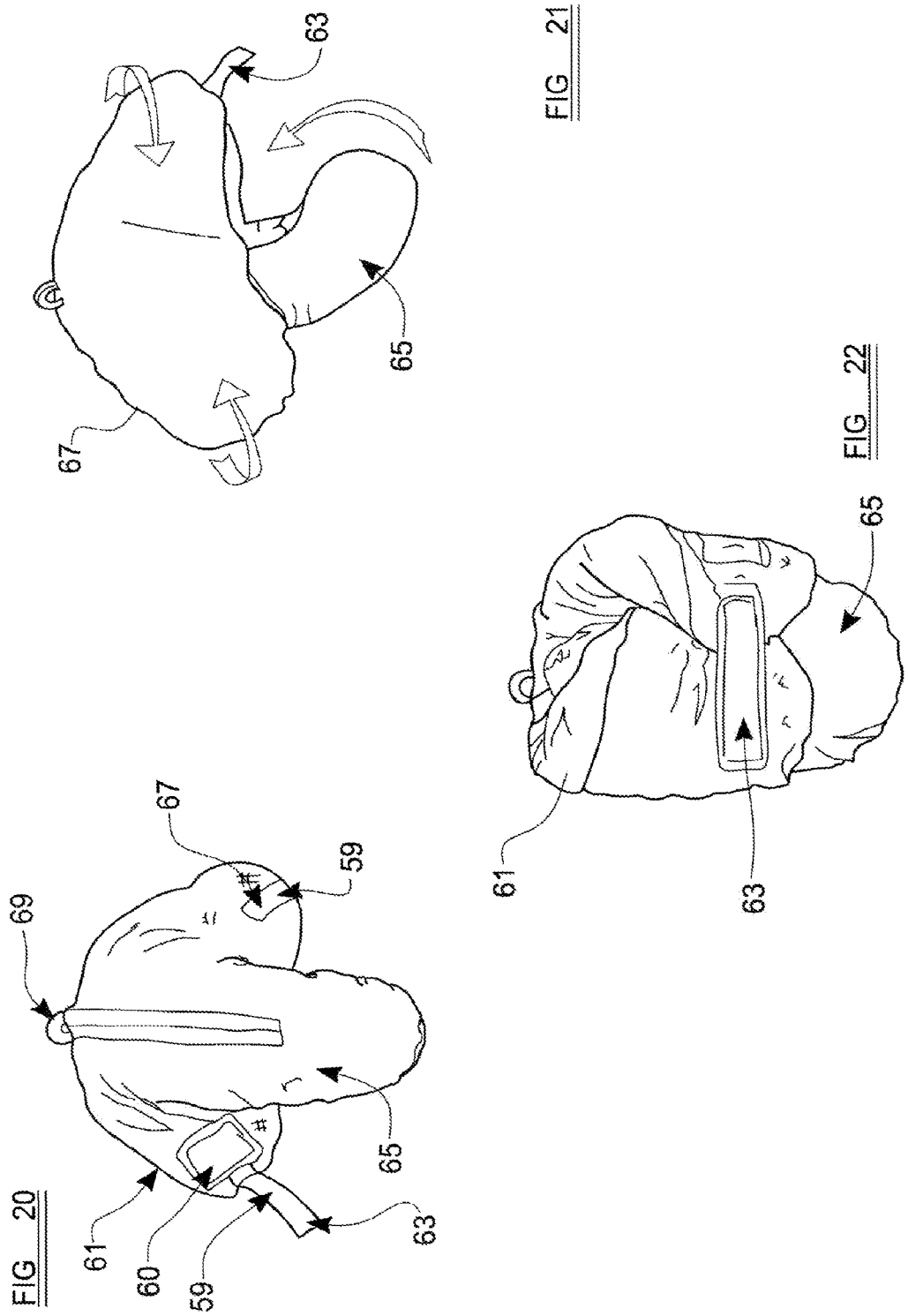

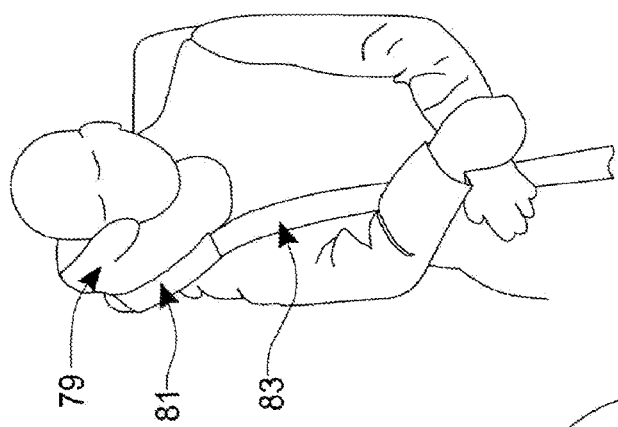
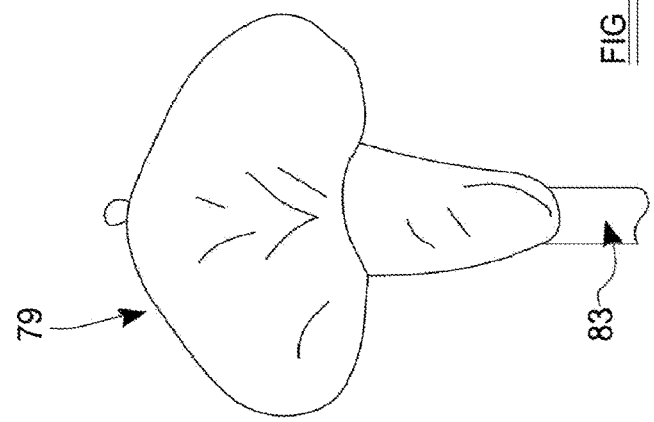
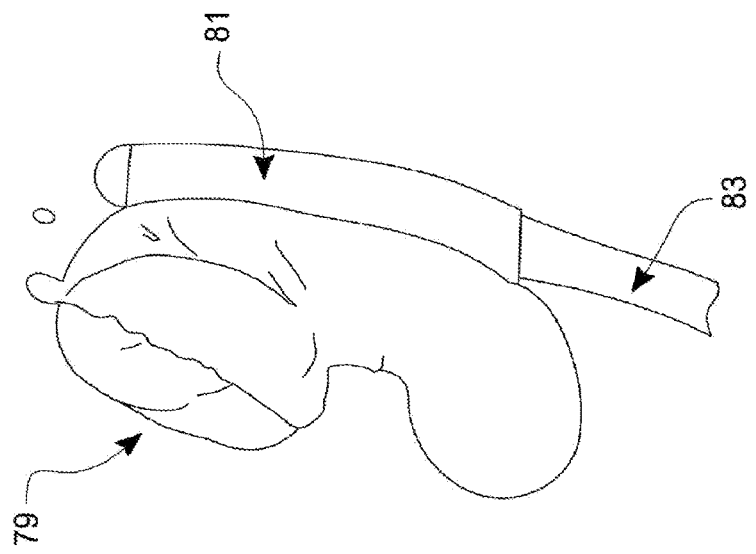

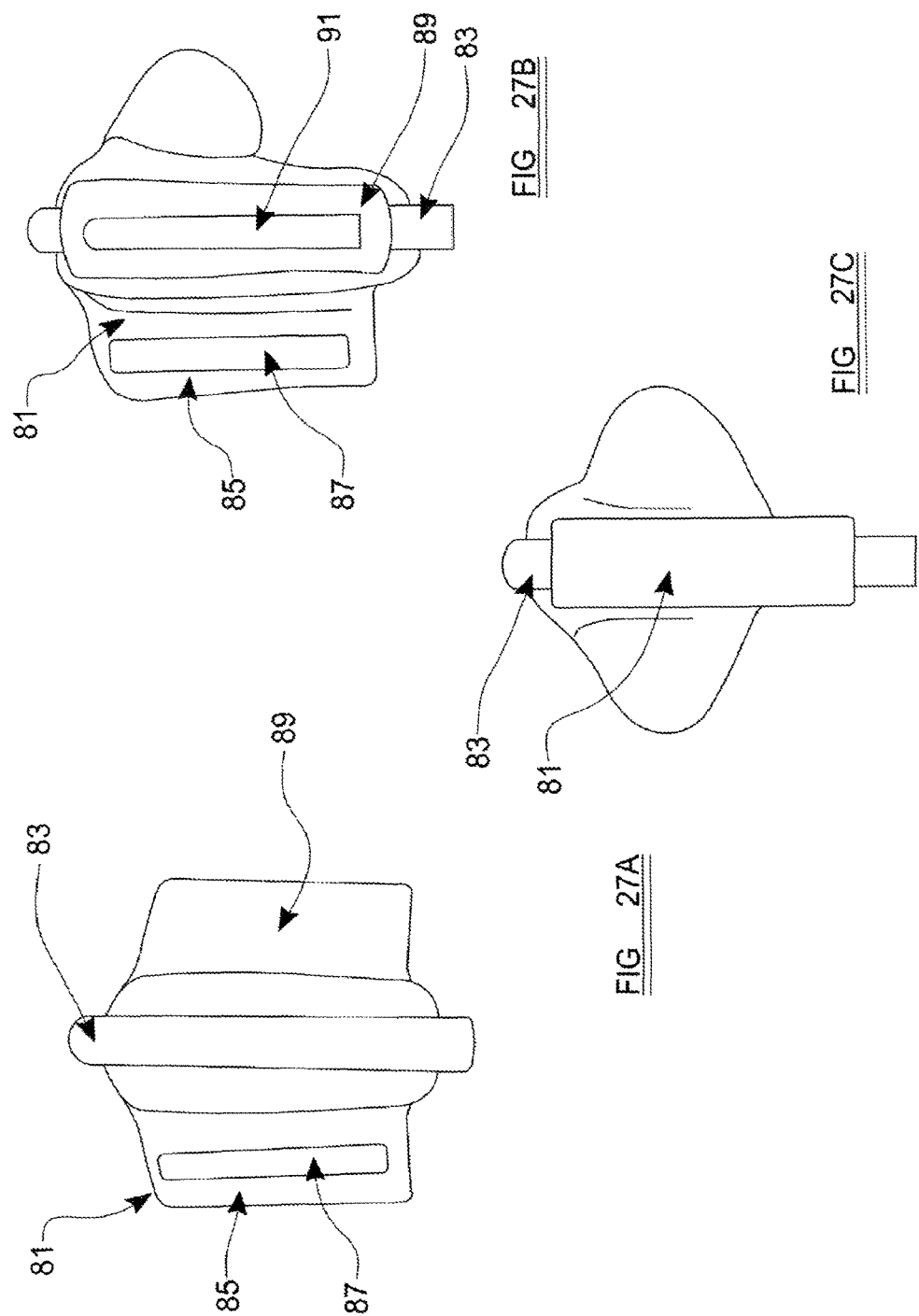

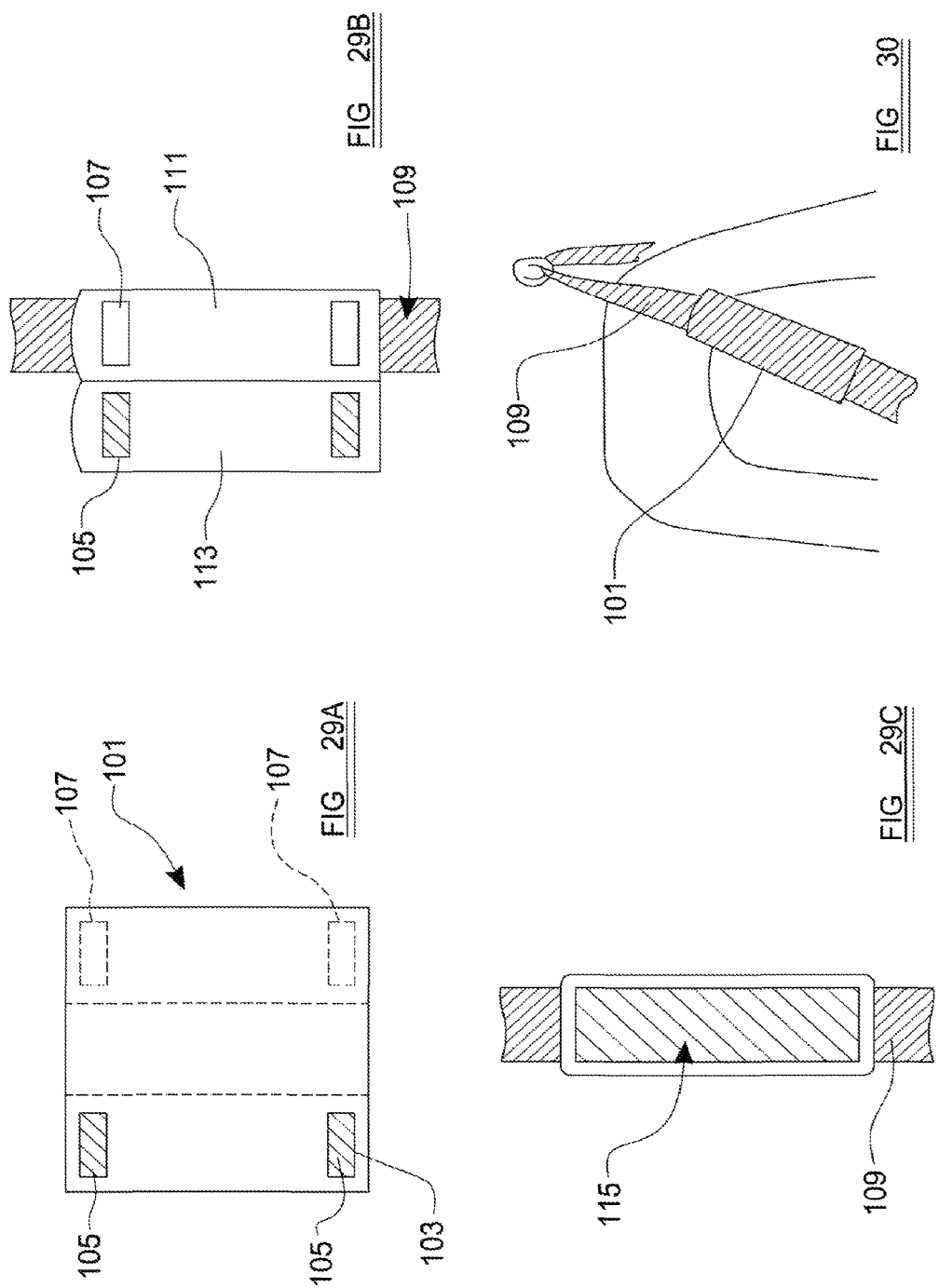

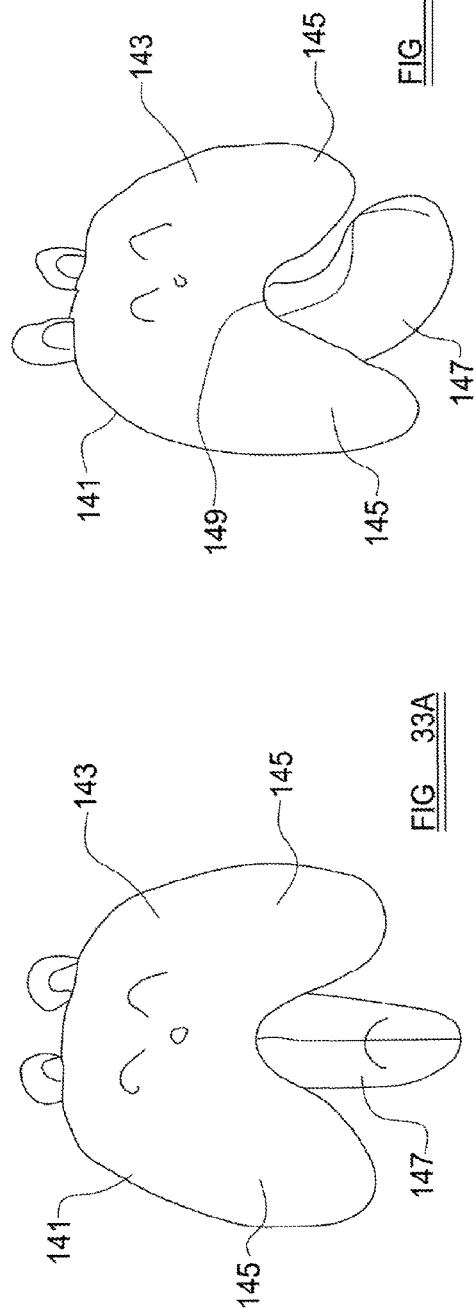
FIG. 33A
FIG. 33B
FIG. 34
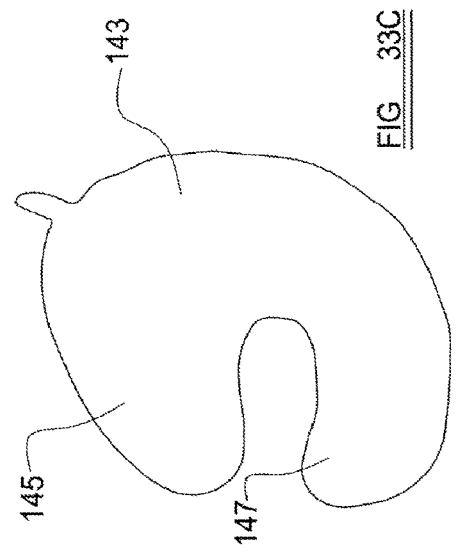
FIG. 33C

CUSHIONS

CROSS-REFERENCE TO RELATED APPLICATIONS

The present application is a continuation U.S. patent application Ser. No. 14/363,727, filed on Jun. 6, 2014, and entitled "Cushions", presently pending. U.S. patent application Ser. No. 14/363,727 is the U.S. National Stage entry of PCT/GB2012/053062.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The invention relates to cushions, particularly though not exclusively to portable travel pillows such as those for supporting the resting head of a traveller sat in a generally upright vehicle seat during a journey.

2. Description of Related Art Including Information Disclosed Under 37 CFR 1.97 and 37 CFR 1.98

Cushions for use in supporting the resting head of a seated person are often referred to as travel pillows, even though they are not limited in their use by people in the act of travelling. Many differing designs of travel pillows exist and each aims to comfortably support the user's head in a position that can be maintained without strain or effort by the user. This has proven to be a difficult problem to solve effectively.

Though many cushion designs may provide comfort when ideally positioned about the person of the user, it is not uncommon that the shaping of the cushion is not conducive to maintaining that ideal position without some effort by the user. A common problem is the slipping of a cushion from the shoulder of a user where, ideally, the cushion should remain if it is to support the resting head of a user effectively. Users typically resort to attempting to hold the cushion in place by hand or by urging a shoulder upwardly to sandwich the cushion between head and shoulder. This inevitably brings discomfort.

Other designs may provide means for retaining a cushion in the intended position about a user. These can involve structures and shapes added to, or formed by, the cushion which reduce its versatility and/or ease of comfortable use. For example, complex and elaborate shapes designed to keep a cushion in place often limit the range of positions a user can place the cushion about their person in use.

A further problem for some existing travel cushions used to support the head is the need either to be tethered around the user, or tied or attached to the back of the chair occupied by the user. Both requirements are very inconvenient. Other travel pillows are U-shaped to prevent them slipping away from the user when worn. However, when the user falls asleep their head will tend to either fall sidewards or forwards.

The U-shaped cushion lacks support to prevent the users head from falling forward and resulting in neck strain.

BRIEF SUMMARY OF THE INVENTION

The present invention desirably aims to provide a secure, versatile and comfortable cushion for supporting the resting head of a user in a generally upright seat or the like.

At its most general, the present invention provides a cushion for supporting the head of a person, the cushion including a first portion that is useable to provide support simultaneously for the back of the head or neck of the person and the side of the head of the person, and a second portion that extends from the first portion and which is usable to provide support for the chin of the person.

In a first of its aspects, the invention provides a cushion including: a pillow portion useable for supporting the head of a user of the cushion; and an elongate trunk portion that extends away from the pillow portion and which is usable for supporting the chin of the user; wherein the pillow portion is shaped so that it is useable to extend from at least a position on the back of the neck of a user whose head is being supported by the pillow portion that is less than three centimeters from the mid-point of the back of the neck to at least a position where it contacts an ear of the user, and wherein in this use of the pillow portion the trunk portion extends away from the pillow portion towards the chin of the user.

Thus, the cushion may simultaneously contact and provide support for the back of the neck of the user, a portion of the side of the head of the user between the back of their neck and their ear, and also for the chin of the user. In this manner, the cushion may securely and comfortably support the resting head of the user.

Considered an alternative way, the present invention can be considered as providing a cushion having a first portion for providing support simultaneously for the back of the neck of a user of the cushion and the side of the head of the user, and a second portion that extends from the first portion for providing support for the chin of the user.

Considered yet another way, the present invention can be considered as providing a cushion having a first portion for contacting and providing support for the back of the neck of a user of the cushion, a second portion for contacting and providing support for the side of the head of the user, and a third portion for providing support for the chin of the user.

Where references are made to the cushion being used or usable by a user, these references refer to an averagely sized human person, e.g. with an averagely proportioned neck and head.

The pillow portion may be shaped so that it is usable to extend from at least a position on the back of the neck of a user whose head is being supported by the pillow portion that is less than three centimeters from the mid-point of the back of the neck to at least cover the mid-point of an ear of the user. Thus, the pillow portion may effectively support the side of the head of the user. The pillow portion may cover the opening of the ear canal of the ear of the user. The pillow portion may cover a portion of the ear extending from the opening of the ear canal to a position at least three centimeters above the opening of the ear canal. Thus, the pillow portion may cover a large part of the ear. Of course, the pillow portion may extend beyond the ear of the user.

The pillow portion may be shaped so that it is useable to extend from at least the mid-point of the back of the neck of a user whose head is being supported by the pillow portion to at least a position where it contacts an ear of the user. That is, rather than extending to a position on the back of the neck of a user whose head is being supported by the pillow portion that is less than three centimeters from the mid-point of the back of the neck, the pillow portion may instead extend to at least the mid-point of the back of the neck. Thus, the back of the neck of the user may be effectively supported by the pillow portion. Of course, the pillow portion may extend across the mid-point of the back of the neck to a position beyond the mid-point of the back of the neck. Thus, the back of the neck of the user may be more effectively supported by the pillow portion.

Preferably, the trunk portion of the cushion is configured (e.g. sized and/or shaped) so that it is usable to contact the underside of the chin of a user whose head is being supported by the pillow. Thus, the trunk portion may provide support for the chin of the user from below the chin, in addition to e.g. providing support for the chin of the user from the side of the chin. The trunk portion may extend to contact at least the mid-point of the underside of the chin of the user. Indeed, the trunk portion may extend across the mid-point of the chin. The trunk portion may be configured so that in one use a top part of the trunk portion contacts the region where the top of the neck joins the jaw, and the underside of the chin is supported by a side portion of the trunk.

The pillow portion may project from the trunk portion transversely to the elongation of the trunk portion, i.e. the trunk portion may protrude or stick out from a side or sides of the trunk portion, so that it is wider than a width of the elongate trunk portion.

The pillow portion may project from the trunk portion transversely to the elongation of the trunk portion from two opposite sides of the trunk portion, i.e. the trunk portion may protrude or stick out from two opposite sides of the trunk portion, so that the pillow portion effectively extends transversely across the trunk portion, e.g. in a "T" or "J" shape, when viewed from the appropriate angle.

Preferably, the pillow portion is formed at a first end of the elongate length of the trunk portion. When this is the case, the trunk portion may taper towards a second end of the elongate length of the trunk portion, e.g. a width of the trunk portion may reduce progressively towards the second end of the elongate trunk portion. Thus, the second end of the elongate trunk portion, which may be a terminal end of the elongate trunk portion, is a narrow part of the trunk portion and may be of a suitable size to be comfortably positioned against or under the chin of the user, to provide support for the chin of the user. Alternatively, the trunk portion may instead be substantially unexpanded at its second end, so that the width of the trunk portion at its second end is substantially the same as the width at e.g. the mid-point of the trunk portion, and the width of the trunk portion may maintain a substantially uniform value towards the second end thereof.

Preferably, the cushion is substantially symmetrical, so that the pillow portion is usable to support the head of a user from either side of the head of the user. Thus, the cushion may be used interchangeably to support the head of the user from either the left side or the right side of the head of the user, depending on the user's preference and the environment in which the cushion is being used, without requiring any significant modification or adjustment. The cushion may be substantially symmetrical about a plane bisecting the pillow portion and containing the trunk portion.

A first side of the pillow portion may provide a surface that is usable to support the head of a user of the cushion, and the trunk portion may extend away from the pillow portion from a second side of the pillow portion opposite to the first side. The trunk portion extending from the pillow portion from the opposite side to the first side may provide extra support to the first side, so that the user's head can be better supported, e.g. some of the force applied to the first side of the pillow portion may be transmitted into the trunk portion.

Preferably, the trunk portion is formed curved or with a bend therein. Put another way, the trunk portion may be formed so that its rest shape is a curved or bent shape, so that force may be required to deform the trunk portion into a different shape. Thus, the trunk portion may be able to curve around the side of the user's head, thereby providing a more comfortable and better support for the user's head, without requiring a force to be applied by the user to maintain the curved or bent shape of the trunk portion.

The cushion may have a recess adapted to engage, in use, the shoulder of a user whose head is being supported by the cushion. The recess may be a suitably shaped cavity, depression or notch. Thus, the cushion may be more easily positioned on the shoulder of a user and may be more securely sited on the shoulder of the user, so that the cushion is less likely to move or fall away from the user, e.g. if the user falls asleep or moves. "Engage the shoulder" may mean that the recess is substantially positioned where the bottom of the neck meets the edge of the shoulder, e.g. the cleft of the neck. The recess may also provide added comfort to the user by helping the pillow to closely abut a side of the user's neck, thereby providing support for the side of the user's head, the back of the neck and the chin.

The recess may be defined by a join between the trunk portion and a periphery of the pillow portion, e.g. the recess may be a corner formed by the meeting of an edge of the trunk portion and an edge of the pillow portion. The join between the trunk portion and the periphery of the pillow portion may make an angle of between 45 and 135 degrees. The join between the trunk portion and the periphery of the pillow portion may make an angle of approximately 90 degrees. Thus, the recess may be shaped so that it is a close fit to the shoulder of the user, so that the cushion is less likely to move or be dislodged from the shoulder. The force of the user's head on the pillow portion may squeeze the cushion against the user's shoulder, whereby the recess positioned around the shoulder may help to maintain the cushion in place on the shoulder.

The trunk portion may be configured so that it is usable to extend across the underside of the chin of a user whose head is being supported by the pillow portion, i.e. the trunk portion may extend from one side of the chin to a point at or beyond the other side of the chin. Thus, the trunk portion may support the entirety of the underside of the chin of the user.

The pillow portion may be shaped so that it is usable to cover a majority of the back of the neck of a user whose head is being supported by the pillow portion (e.g. more than 75% of the back of the neck of the user, or substantially the whole of the back of the neck of the user). The pillow portion may extend substantially across the majority of the back of the neck of the user from substantially a first side of the neck to substantially a second side of the neck, thus providing support for the majority of the back of the neck of the user.

The pillow portion may extend across substantially the whole of the back of the neck of the user.

The pillow portion may be shaped so that it is usable to extend from substantially the back of a side of the head of a user whose head is being supported by the cushion to substantially the front of the side of the head. Thus, the pillow portion may extend along substantially the whole length of the side of the head of the user and provide support for substantially the whole length of the side of the head of the user.

The cushion may include an internal partition part separating an inner volume of the pillow portion from an inner volume of the trunk portion. Thus, the pillow portion and trunk portion may be separate volumes. The separation of the pillow portion and trunk portion into separate volumes may allow for different materials, or different densities of materials, to be used in the pillow portion and the trunk portion, e.g. so that their respective properties can be optimised for their intended purposes. Where the pillow portion is positioned at an end of the trunk portion, the internal partition may be positioned to separate the end of the trunk portion that joins the pillow portion from the pillow portion.

The trunk portion may be formed with a bend in a part of its elongate length, wherein the degree of bend at said part is greater than any degree of bend formed elsewhere in the trunk portion. Said part may be a bend-part of the elongate trunk. A localised bend in the length of the trunk portion, as opposed to e.g. a smooth curvature along the entire length of the trunk portion, may enable the trunk portion to more closely match the side of the users head, e.g. to curve around the edge of a jaw of the user. Some or all parts of the elongate length of the trunk portion extending to a terminal end of the trunk portion from the bend-part may be substantially linear.

The bend-part may define a bend resulting in an angular deviation of the elongate length of the trunk portion exceeding 90 degrees. Alternatively, the bend-part may define a bend resulting in an angular deviation of the elongate length of the trunk portion of substantially 90 degrees. Alternatively, the bend-part may define a bend resulting in an angular deviation of the elongate length of the trunk portion of less than 90 degrees.

The cushion may comprise two or more fastening means that are fastenable together to retain the pillow portion in a folded state. Thus, the pillow portion may be secured in a folded state in which the size of the pillow portion is reduced, in order to make transportation of the pillow, e.g. in a person's luggage, easier.

The two or more fastening means may comprise a first foldable tab possessing first attachment apparatus spaced from and adjacent to a second foldable tab possessing second attachment apparatus, wherein the pillow portion is foldably deformable to position the first tab to foldably overlap a surface part of the second tab to bring the first and second fastening apparatus into mutual engagement to fasten together thereby to retain the pillow portion in the folded state.

Alternatively, the first and second fastening means may comprise first and second magnets. These magnets may be sewn into opposite sides of the pillow portion, so that the pillow portion can be maintained in a folded configuration by folding the pillow portion so that the magnets come into contact and are fastened together. Of course, the fastening means may be replaced with other fastening means that would be known to the skilled person, for example a toggle and loop arrangement or a popper arrangement.

The trunk portion may be adjustably deformable by the user to form a curve or bend in the trunk portion, which curve or bend is substantially maintained after the deformation, i.e. the trunk portion may be shaped by a user into a curved or bent shape which then becomes the rest shape of the trunk portion. Thus, the cushion may initially be in a flat state, e.g. for ease of packing and transportation of the cushion. The user may then deform the trunk portion into a shape that is suitable for their head size and shape, to provide comfortable support for their head.

The cushion may include a slip-resistant material formed at a part of the exterior surface thereof, i.e. a material that has a high coefficient of friction or that provides a good grip on an external surface. Thus, the cushion may be less likely to slip or to move when the cushion is pressed against a surface by a user, e.g. a headrest of a chair.

The trunk portion may also be usable for supporting the back of the neck of the user, i.e. the trunk portion may have a second role/use, as an alternative to the first role/use discussed above, in which it is usable to support the back of the neck of the user.

The trunk portion may be configured so that it is also usable to hook around the back of the neck of the user. Thus, in its alternative second role/use the trunk portion may be used to curve around part of all of the back of the neck of the user to provide support for the back of the neck of the user.

The pillow portion may be shaped so that it is also usable to extend from at least a side of the chin of a user whose head is being supported by the pillow portion to at least contact an ear of the user. Thus, the pillow portion may have a second role/use, as an alternative to the first role/use discussed above, in which it is used to provide support for at least a side of the chin of the user and for a region of the side of the head of the user extending at least up to an ear of the user.

Thus, the cushion may be usable in a second configuration in which the trunk portion contacts and supports the back of the neck of the user, and in which the pillow portion contacts and supports both a side of the chin of the user and a region of the side of the head of the user extending at least up to an ear of the user.

The cushion may comprise a cushion case stuffed or filled with compliant material. Thus, the cushion may easily be made to have a desired density and resilience by stuffing it with an appropriate type and amount of material.

The pillow portion may project (i.e. stick out or protrude) transversely (i.e. sideways) from a side of the trunk portion by a distance of at least 5 cm. Alternatively, the pillow portion may project transversely from a side of the trunk portion by a distance of at least 10 cm. Thus, the size of the pillow portion may be such that it extends from the trunk portion sufficiently to support both the side of the head of the user and the back of the head or neck of the user.

The pillow portion may present a support surface for supporting the head of the user with a surface area of at least 200 square centimeters. Alternatively, the support surface may have a surface area of at least 250 square centimeters. Thus, the size of the support surface may be sufficient to securely support both the side of the head of a user of the cushion and the back of the head or neck of the user.

The support surface may be substantially crescent shaped, e.g. so that it may curve about the shoulder of a user of the pillow. The pillow portion itself may be crescent shaped (e.g. with curved upper and lower edges).

The pillow portion may have a longest length, i.e. a longest single dimension of the pillow portion, of at least 20 cm. Alternatively, the pillow portion may have a longest length of at least 25 cm Therefore, the length of the pillow portion may be sufficient for the pillow portion to extend from the back of the head or neck of the user across the side of the user's face, so as to provide better support for the user's head.

The pillow portion may present a support surface for supporting the head of a user that is concavely curved (inwardly curved), i.e. the support surface may have a central part that is recessed or depressed relative to the edges of the support surface. This configuration of the support surface may enable the support surface to better fit against and support the head of the user, therefore making the cushion more comfortable for the user, e.g. compared to a support surface that bulges outwards in the centre.

The trunk portion may have a cross-sectional shape that is substantially oval, ovoid or circular towards a terminal end of the trunk portion. Thus, if the terminal end of the trunk portion is hooked under the user's chin, the cross-sectional shape of the trunk portion may be optimised to support the user's chin.

The cushion may comprise attachment means for separably attaching the cushion to an article, e.g. a pole, a head-rest of a seat-belt. Attaching the cushion to an article may remove the need for the user to hold or grip the cushion, and therefore may make it less likely that the cushion will move or fall away from the user, e.g. if the user falls asleep.

The attachment means may comprise a first foldable tab possessing first fastening apparatus spaced from and adjacent to a second foldable tab possessing second fastening apparatus wherein the first tab is foldable to overlap a surface part of the second tab to bring the first and second fastening apparatus into mutual engagement to fasten together thereby to fasten the first and second tabs together to permit the head-support cushion thereby to attach to an article located in the space between the tabs. Thus, the cushion may be easily and securely fastened to an article, e.g. to a support rod or a seatbelt of a vehicle. Indeed, the cushion may include a separate cushion support shaft separably attachable to the head-support cushion via the attachment means.

The trunk portion may have an axial end-to-end length of at least 18 cm.

Alternatively, the trunk portion may have an end-to-end length of at least 25 cm. Thus, the trunk portion may be sufficiently long to extend to at least contact the chin of the user, to provide support for the user's chin.

The trunk portion and/or the pillow portion may be resiliently compliant. Thus, the cushion may provide comfortable support for the user by deforming somewhat to match the shape of the user's head and neck when the user's head or neck applies a force to it.

The pillow portion may be shaped so that, in use, it completely covers the ear of a user whose head is being supported by the pillow portion. Thus, the pillow portion may support a majority of the side of the head of the user.

The cushion may be a head-support cushion, a head-support pillow or a head-support travel pillow.

The pillow portion may be defined by a lateral expansion formed at one end of the trunk portion which projects from the trunk portion so as to extend transversely to opposite sides of the trunk portion to present a terminal surface defining a head support surface adjacent to the trunk portion, and the cushion may be configured so that when the trunk portion is hooked under the chin of a user of the cushion the head support surface is positioned diagonally down along the side of the head of the user in a direction adjacent the user's eye and extending down past the user's ear, and a part of the head support surface is bent to curve behind the back of the user's head so that it forms a cushion for the lower back of the users head and neck to rest on.

In a second of its aspects, the invention provides a cushion case structured and arranged to be filled with compliant stuffing material to define a cushion according to the first aspect of the invention.

In a third of its aspects, the invention provides an inflatable cushion comprising a cushion case inflatable to define a cushion according to the first aspect of the invention.

In a fourth of its aspects, the invention may provide a cushion comprising an elongate trunk portion with a bend therein (e.g. bent or hooked) and a pillow portion defined by a lateral expansion formed at one end of the trunk portion which extends transversely to opposite sides of the elongate trunk portion to present a terminal surface defining a head support surface (e.g. panel) adjacent to the trunk portion.

In a fifth of its aspects, the invention may provide a cushion for supporting the head of a user, comprising: an elongate trunk portion shaped with a bend therein; and a pillow portion defined by a lateral expansion formed at one end of the trunk portion which projects from the trunk portion so as to extend transversely to opposite sides of the trunk portion to present a terminal surface defining a head support surface adjacent to the trunk portion, wherein the cushion is configured so that when the trunk portion is hooked under the chin of a user of the cushion the head support surface is positioned diagonally down along the side of the head of the user in a direction adjacent the user's eye and extending down past the user's ear, and a part of the head support surface is bent to curve behind the back of the user's head so that it forms a cushion for the lower back of the users head and neck to rest on.

Preferably, in use, this permits the trunk portion to support the chin of the user while the head support surface supports a side of the resting head of the user. The cushion need not be tethered. Placing the cushion between the user and a surface (e.g. a high back chair, a wall, a window etc) to lean against has been found to retain the cushion on position. The shaping of the cushion has been found to be exceptionally conducive to retaining its position about the person of the user in such natural circumstances.

The trunk portion is preferably resiliently compliant. The pillow portion may project from the trunk portion such that the head support surface extends in a direction generally transverse to an elongation of the trunk portion. The elongation of the trunk portion may hook in a direction generally transverse to the head support surface thereby to position a terminal end of the trunk portion adjacent to the head support surface. Accordingly, this structuring permits the trunk portion to engage the head or neck of the user while the head support surface supports a side of the head of the user, in use.

For example, in the first position the trunk may be positioned to curl/hook under the users chin. The pillow portion may be positioned above a shoulder at the side of the head in this case. In a second example, the trunk may be positioned to hook/curl around the nape of the neck with the pillow portion at, and somewhat forward of, the shoulder adjacent the jaw and chin of the user. Thus, by curling around the chin or the back of the neck of the user, the trunk may engage with the user to retain its position whilst providing chin support and comfort.

In a sixth aspect, the invention may provide a cushion as described herein, wherein the trunk portion is adjustably deformable by the user to bend (e.g. become hooked) in shape, and desirably to retain the bent shape. Thus, the cushion may be made and sold with a substantially straight trunk portion, which is adjustable to bend (e.g. hooked form) to suit the comfort of the user. A suitable foam or axial/longitudinal wire insert, such as would be apparent to those skilled in the art, may be employed in the trunk portion which serves to reversibly or adjustably retain a given shape to which the user deforms it in use.

In a seventh aspect, the invention may provide a cushion for supporting the head of a user, comprising: an elongate trunk portion and a pillow portion defined by a lateral expansion formed at one end of the trunk portion which projects from the trunk portion so as to extend transversely to opposite sides of the trunk portion to present a terminal surface defining a head support surface adjacent to the trunk portion, wherein the trunk portion is adjustably deformable by the user to bend, and; wherein, the cushion is configured so that when the trunk portion is hooked under the chin of a user of the cushion the head support surface is positioned diagonally down along the side of the head of the user in a direction adjacent the user's eye and extending down past the user's ear, and a part of the head support surface is bent to curve behind the back of the user's head so that it forms a cushion for the lower back of the users head and neck to rest on.

The trunk portion may extend from a side of the pillow portion reverse to the side thereof defining said head support surface.

The pillow portion may project from either side of the trunk portion such that the head support surface extends transversely across the trunk portion. Thus, the trunk may be formed to fan-out or spread out laterally at, or adjacent to, one end to provide an expansive head support panel on a side of the pillow portion.

In a first use of the pillow portion, with the trunk portion hooked under the user's chin, the head support surface may be positioned diagonally down (e.g. in a direction adjacent the user's eye and extending down past the ear) along the side of the head. The compliance and deformability of the pillow portion enables a part of this head support surface to be bent to curve behind the back of the user's head so that it:

(a) forms a cushion for the lower back of the head and neck to rest on which gives comfort, and (b) when the user leans back against it, the weight of the users head keeps the pillow and elongate trunk in place thus preventing the head from falling forward.

In a second use, the trunk portion may hook around the nape of the neck (which the user may keep it in place when leaning back against a support surface such as a high backed chair) and the head support surface consequently extends diagonally downwardly adjacent to the user's cheek (e.g. from the eye down to under the side of the chin). Consequently, the side of the head and chin are supported. The cushion is kept in place by the user leaning back against the trunk portion.

The cushion is preferably substantially symmetrical about a plane bisecting the cushion portion and containing the elongated trunk portion.

A width of the trunk portion may be tapered to reduce progressively towards the terminal end thereof.

The cushion may define a corner recess adapted to engage, in use, a shoulder of a user, the corner recess being defined by the convergence to a join between the trunk portion and a periphery of a pillow portion nearest the terminal end of the trunk portion. A peripheral edge of the pillow portion presented away from the terminal (i.e. free) end of the trunk is preferably arched.

The trunk portion may define/follow a bend (e.g. be hooked) shaped to be substantially continuously curved along the elongate length of the trunk portion.

The cushion may comprise a cushion case stuffed or filled with compliant material.

In an eighth of its aspects, the invention may provide a cushion for a padded cushion fillable with compliant filler, padding or stuffing to define a cushion according to the invention in one of the previous aspects.

In a ninth of its aspects, the invention may provide an inflatable cushion comprising a cushion case inflatable to define a cushion according to the invention in one of the previous aspect.

The cushion may be a travel pillow.

The cushion, or the cushion case, may comprise a slip-resistant material at parts of the exterior surface thereof. This permits the exterior surface of the cushion to better grip or engage with a support surface against which the cushion may be urged, rested or wedged by the user in use—such as against a high-backed chair, a window or wall. Examples of slip-resistant material include PVC (Polyvinyl Chloride), foam, or rubber or other material such as would be apparent and available to the skilled person. The slip-resistant material may be arranged on the exterior surface of the pillow portion. Preferably, the slip-resistant material is arranged at and/or around those parts of the pillow portion reverse to the support panel—e.g. those parts from which the trunk portion extends. In use, it is typically these parts of the cushion which are urged against a support surface as a user positions his/her head against the support panel. By providing slip-resistance at that surface of the cushion, it is rendered better able to retain the position desired by the user. The slip-resistant material may be applied in liquid to the fabric of the exterior surface of the cushion (or of a cushion cover/case worn by the cushion) during manufacture so that it penetrates the fabric and becomes embedded therein. Subsequent solidification by curing or hardening results in an external area of the cushion (or the cushion case/cover) having a much higher coefficient of friction than that of the cushion fabric within which it is embedded. The slip-resistant material may be provided on the cushion in the form of an array of a plurality of isolated spots, patches of stripes separated by regions of the fabric of the exterior surface of the cushion (or cushion case). This means that the fabric of the cushion (or case) can retain its elasticity between the patches of slip-resistant material to allow the cushion to remain compliant in response to pressure from the user's head etc.

Desirably, the invention in any of its aspects as well as supporting the resting head, the cushion may also support the chin when used in a first way, therefore stopping the head from falling forward. When used in a second way, it supports the head, back of the neck and chin, as described above.

A very common complaint of travellers is that when they fall asleep upright their head either falls to the side or falls forward. Sleeping for a prolonged time in this uncomfortable position will cause neck pain.

Desirably, the present invention aims to address this problem. When used the first way, the cushion supports the head from falling to the side and also supports the chin, therefore preventing the head from falling forward. The cushion may do this in three ways.

(1) the weight of the user's head against part of the pillow portion presses it against a support surface such as a high back chair, wall or window. This keeps the pillow in place and therefore stops the head falling forwards; and, (2) The parts of the trunk at the pillow portion thicken the cushion there and may form a spine or ridge at the pillow portion positionable over/against the shoulder to keep the pillow portion in place therefore stopping the head from falling forwards; and, (3) The suitable thickness and width of the trunk portion providing support under the traveller's chin may fill the gap under the chin stopping the head from falling forwards.

When the pillow is used the second way, leaning back against the trunk portion around the nape of the neck not only supports the traveller's neck preventing neck strain but also helps keep the pillow in place. Keeping the pillow portion in place prevents the head from falling to the side. Feature (2) above in relation to the first way of use applies equally to the second way of use. The pillow portion now lies on the side of the head, the cheek and partly under the chin. This offers some support for the resting chin. If the chin and the head are supported, then the likelihood of the head falling forwards will be reduced.

The cushion may comprise an internal partition part separating an inner volume of the pillow portion from an inner volume of the trunk portion. This has been found to help the cushion retain its shape in use. For example, the internal partition may be positioned to separate an end of the trunk portion which joins the pillow portion, from the pillow portion it joins. In this way, the partition prevents the contents of the trunk portion (e.g. stuffing) from migrating into the pillow portion and vice versa. The cushion has been found to much better retain its shape and firmness when the partition is so placed. The cushion may comprise a cushion case stuffed or filled with compliant material and the internal partition may be attached to the cushion case internally. The partition may be a panel of fabric attached (e.g. sown) to the cushion case internally to close-off the trunk portion from the pillow portion thereby to keep the contents (e.g. stuffing etc) of the two internal volumes separate.

BRIEF DESCRIPTION OF THE SEVERAL VIEWS OF THE DRAWINGS

To better illustrate how the invention could be implemented, there follows an exemplary but non-limiting embodiment of a travel pillow according to the invention described with reference to accompanying drawings of which:

FIG. 20 shows a rear view of a cushion according to a further embodiment of the invention, wherein the cushion has fastening means so that the cushion can be secured in a folded configuration;

FIG. 21 shows a perspective view of the cushion of FIG. 20;

FIG. 22 shown a front view of the cushion of FIGS. 20 and 21, wherein the cushion has been secured in a folded configuration using the fastening means;

FIGS. 26A to 26C show side, front and perspective views of a cushion according to a further embodiment of the invention, in which the cushion is attached to a support pole using attachment means of the cushion;

FIGS. 27A to 27C show rear views of a cushion according to a further embodiment of the invention, in which the cushion has attachment means for attaching the cushion to an article;

In the drawings like articles are assigned like reference symbols.

FIG. 29A shows a front view of a seatbelt sleeve according to a further embodiment of the invention.

FIGS. 29B and 29C show front views of the seatbelt sleeve of FIG. 29A being secured around a seatbelt.

FIG. 30 shows a front view of the seatbelt sleeve of FIGS. 29A to 29C secured around a seatbelt.

FIGS. 33A to 33C show front, perspective and side views of a cushion according to a further embodiment of the invention.

FIG. 34 shows a perspective view of the cushion shown in FIGS. 33A to 33C being used by a child to support their head.

DETAILED DESCRIPTION OF THE INVENTION

Figure 1:
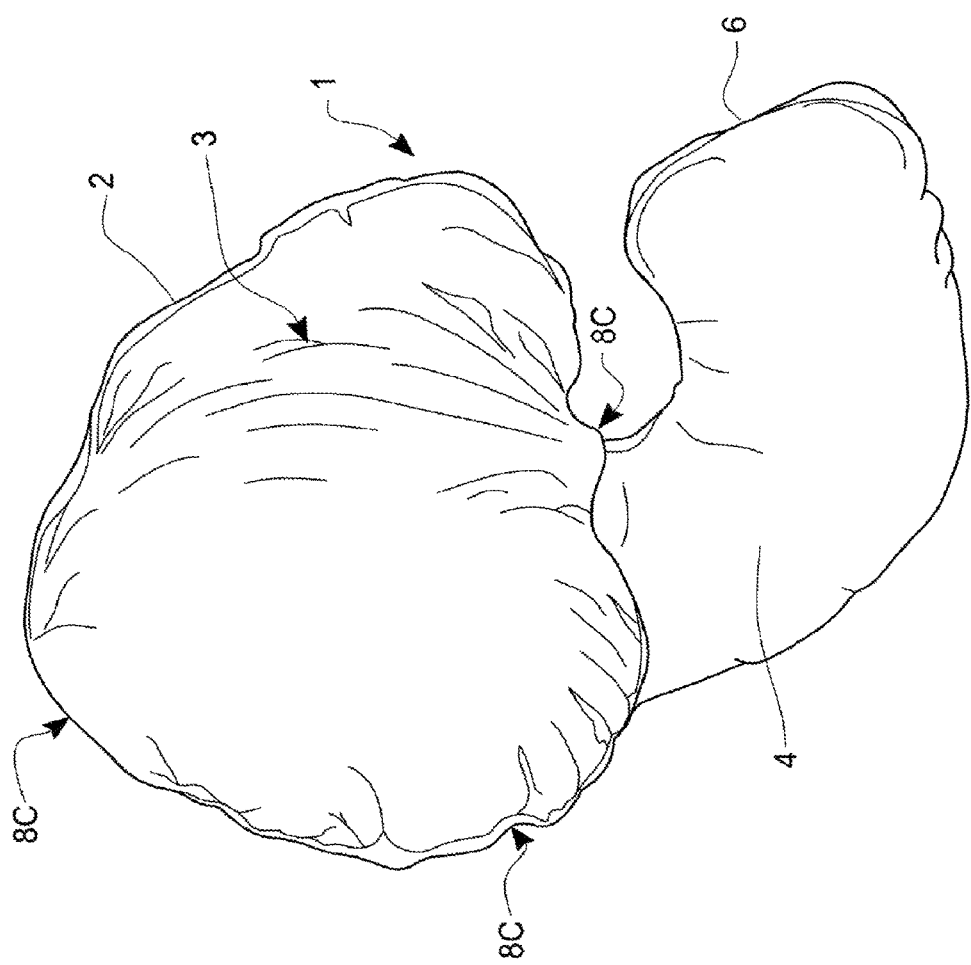
FIG. 1 illustrates a perspective view of a stuffed cushion according to the invention.
Figure 2:
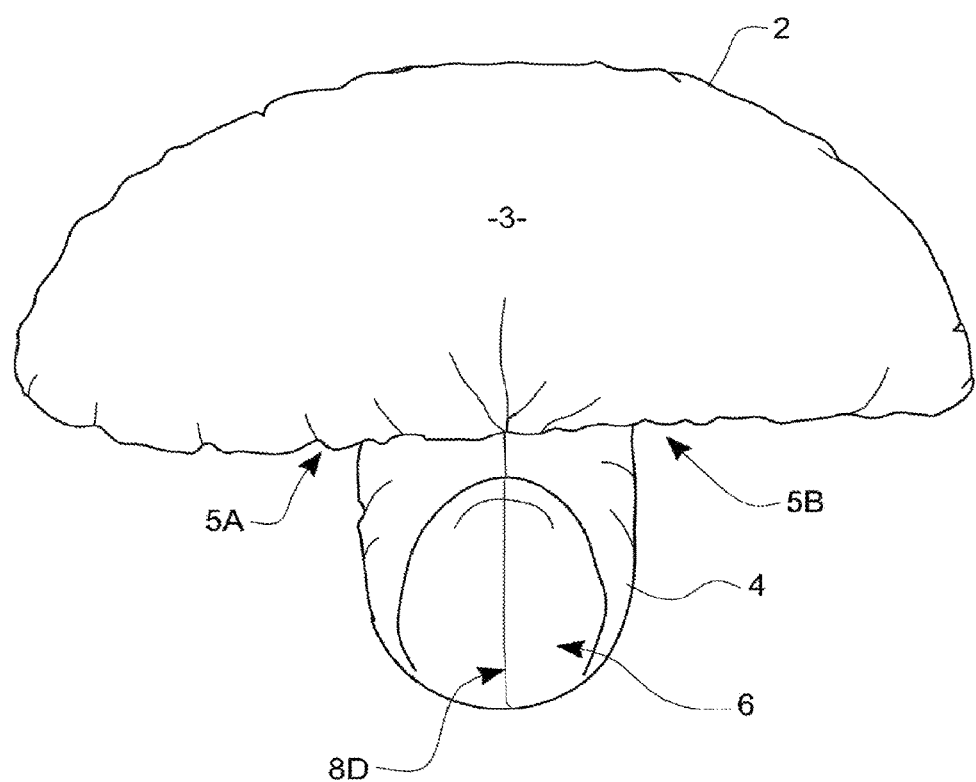
FIG. 2 illustrates a plan view of the stuffed cushion of FIG. 1.
Figure 3:
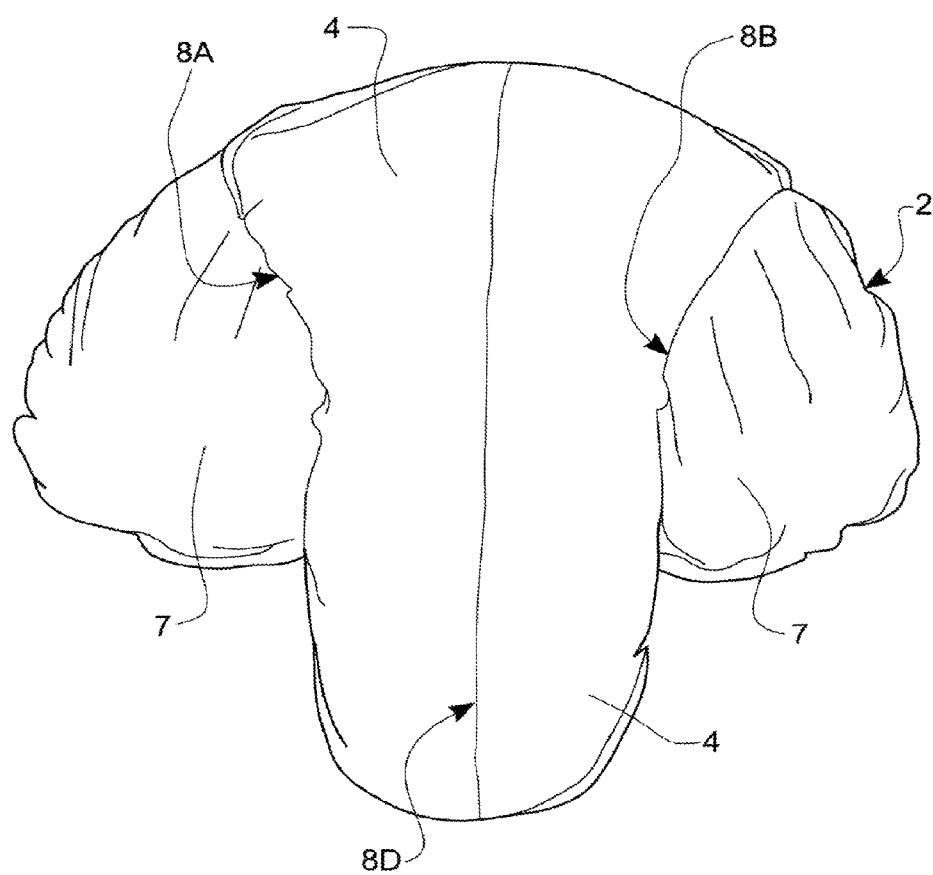
FIG. 3 illustrates a back view of the stuffed cushion of FIG. 1.
Figure 4:
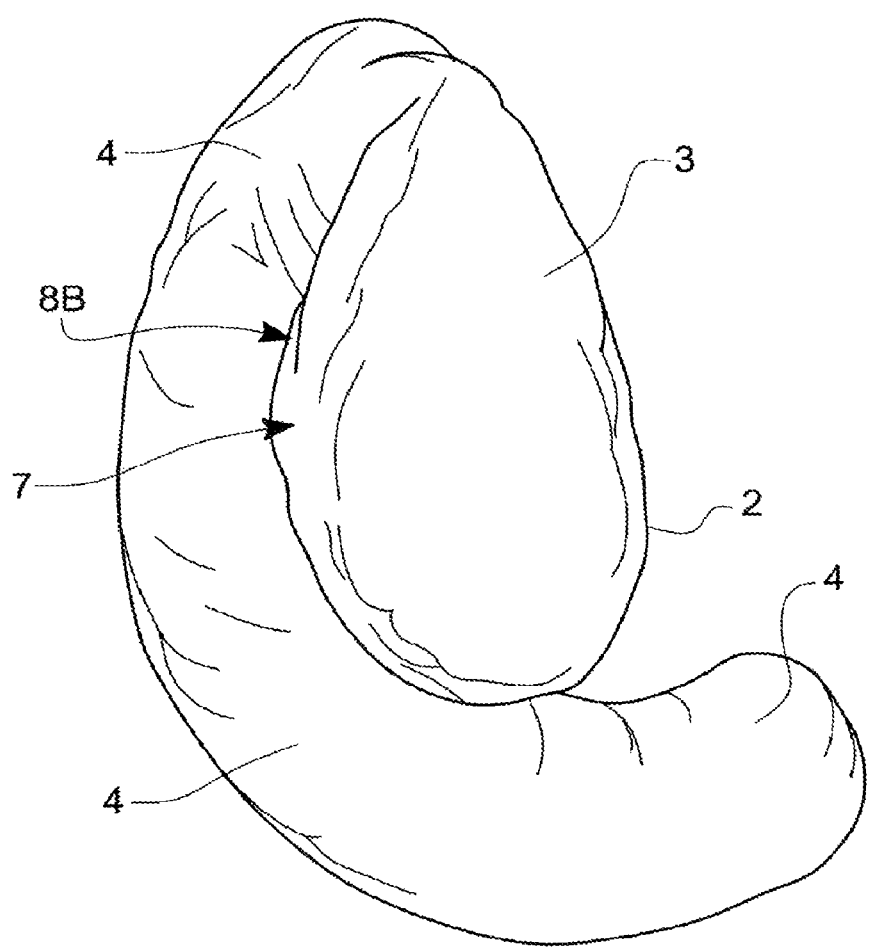
FIG. 4 illustrates a side view of the stuffed cushion of FIG. 1, the view from the opposite side of the cushion (not shown) corresponds.

FIGS. 1 to 4 illustrate, respectively, a perspective, front, back and side view of a travel pillow in the form of a cushion comprising a pillow portion (2) defining a head support surface (3) adapted and arranged for supporting a resting head of a user in a generally upright seat. The cushion possesses an elongated trunk portion (4) defining a resiliently compliant bend which extends from the pillow portion (2) to render the trunk generally hooked in shape at least towards a free end thereof distal from the pillow portion. The pillow portion projects from the trunk portion (4) such that the head support surface extends in a direction generally transverse to the elongation of the trunk portion. The elongation of the trunk portion is directed to follow a bend (i.e. to hook) in a direction generally transverse to the direction in which the head support surface extends to position a terminal end (6) of the trunk portion adjacent to the head support surface (3).

The pillow portion (2) is shaped to define a pillow structure comprising on one side (shown) the head support panel (3) bounded by peripheral pillow edges defining a substantially semi-circular (e.g. "D"-shaped) boundary. The head support panel presents a broad surface which, although not completely flat, displays relatively little curvature other than adjacent to the periphery of the pillow structure. The width and depth of the head support panel exceed the thickness of the pillow structure of which it forms a part. The arched portion of the semi-circular pillow periphery is presented at one end of the cushion furthest from the terminal end (6) of the hooked trunk portion, while the substantially straight portion of the semi-circular pillow periphery is nearest to the terminal end of the hooked trunk. The result is that the outwardly-presented edge of the pillow portion has a curvature enabling the orientation of the pillow portion, and of the hooked trunk extending from it, to be adjusted by a user easily by rotation of the whole cushion without significant obstruction by that edge, For example, the user may wish to rotate the cushion to achieve a more comfortable position whilst in an aircraft seat against which a part of the arched peripheral edge of the pillow portion abuts when the cushion is used. The arched nature of the pillow edge enables an adjacent part of the edge to be brought into abutment with the seat, by action of the user's adjustment of the cushion, without difficulty or obstruction by the pillow portion.

The hooked trunk portion (4) defines a continuously curved cushion elongation extending from, and integrally formed with, a rear side (7—FIG. 3) of the pillow portion reverse to the side defining the head support panel (3). The trunk portion is substantially crescent-shaped. The trunk portion emerges from the rear side of the pillow portion as a diametric spine or ridge extending substantially from the mid-region of the arched peripheral edge of the pillow portion, along and across the rear side of the pillow portion to (and beyond) the substantially straight diametrical portion of the semi-circular peripheral edge of the pillow portion.

In this way, the trunk portion (4) presents a ridge or spine which bisects the rear surface of the pillow portion. This adds strength to the cushion and renders the relative positioning and orientation of the pillow part and the hooked trunk part more robust and resilient—i.e. far less prone to sagging, deformation or floppiness of the pillow portion relative to the trunk portion. Furthermore, a corner recess (5A, 5B, FIG. 2) is defined by the junction between the trunk portion and the pillow portion at the straight diametrical portion of the pillow edge. Each such corner recess serves to accommodate the shoulder of a user to help mount the cushion to the user more securely adjacent the head.

The spine not only adds strength and robustness to the pillow but the thickness and width of it assist too. When the pillow is used in the first way, with the trunk under the chin, the thick spine and trunk support extends down over the shoulder and wedges in under the chin, resting against the users shoulder and on top of the clavicle keeping the pillow in place and the head from falling forward. When the pillow is used in the second way, the thickness of the top part of the spine over the shoulder helps provide support for the head when placed on the head support surface.

The hooked trunk portion extends beyond the rear side of the pillow portion in a continuing arc which directs the trunk portion past the straight peripheral edge of the head support panel and onwards in a direction transverse to the panel to a terminal end located beyond the head support panel of the pillow portion. In this sense, the terminal end of the hooked trunk portion is "visible" to the head support panel, being offset from the head support panel such that the trunk portion does not extend over it. Collectively, the head support panel and the parts of the trunk portion visible to it, define a structure adapted for receiving the side of a user's resting head (the head support panel) while concurrently supporting either the underside regions of the head (the hooked trunk portion) either to the front of the head under the chin, or to the rear of the head in the nape of the user's neck.

Figure 5:
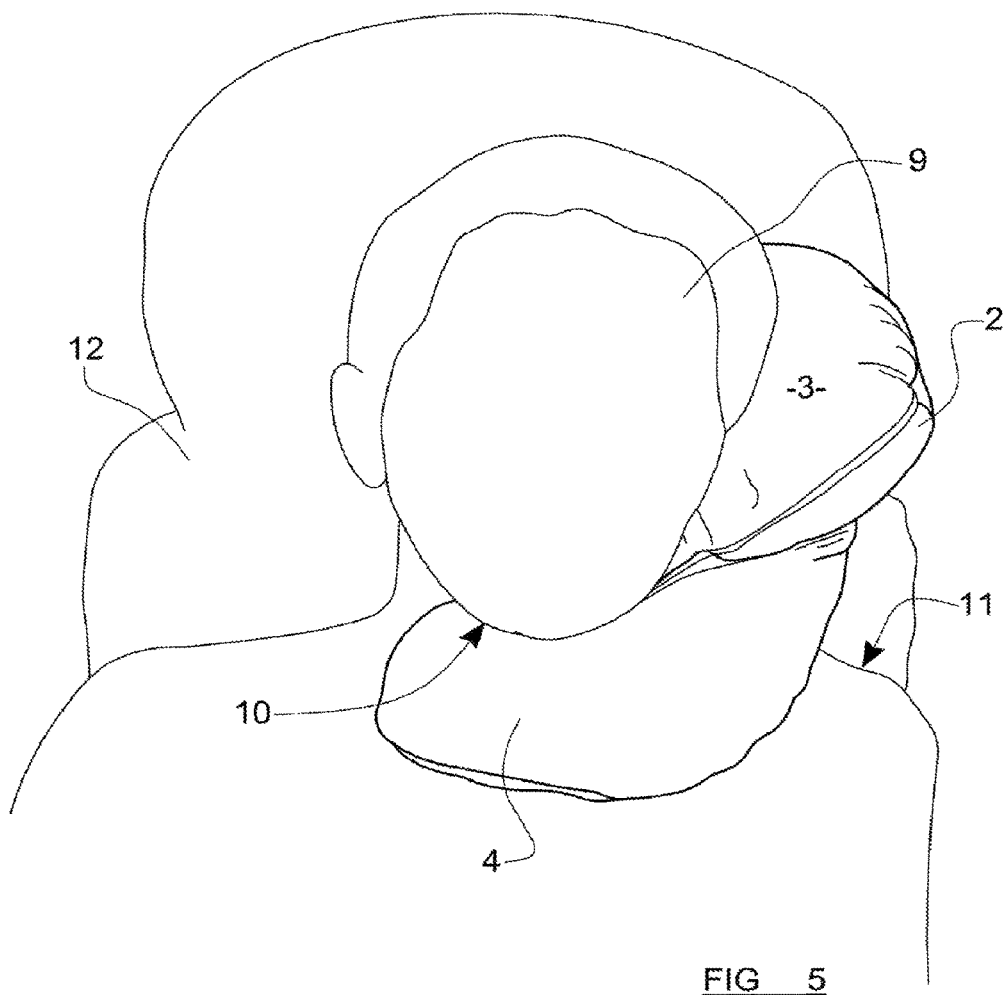
FIG. 5 illustrates a front view of a first use of the cushion of FIGS. 1 to 4.
Figure 6:
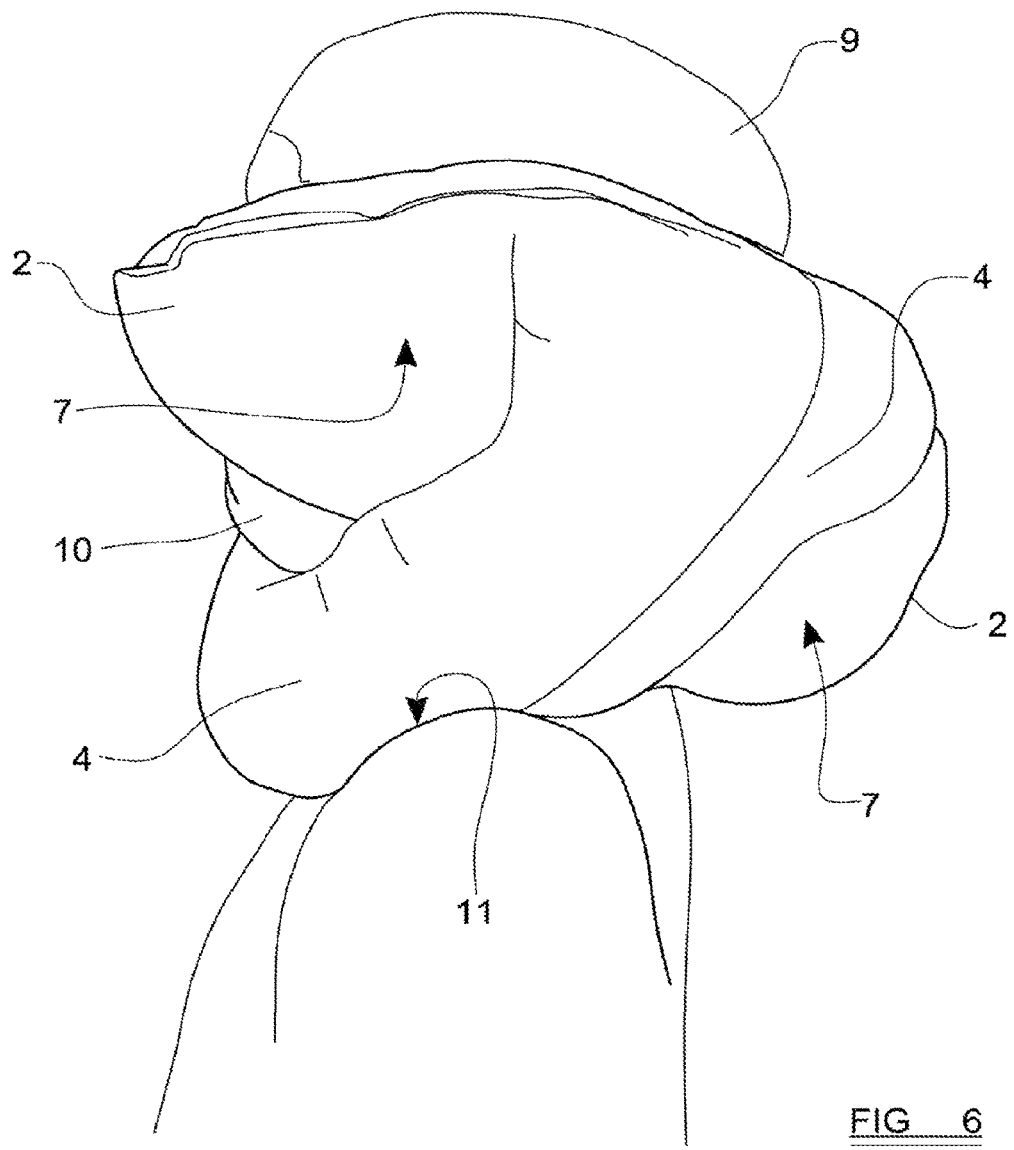
FIG. 6 illustrates a side view of the first use of the cushion of FIG. 5.
Figure 7:
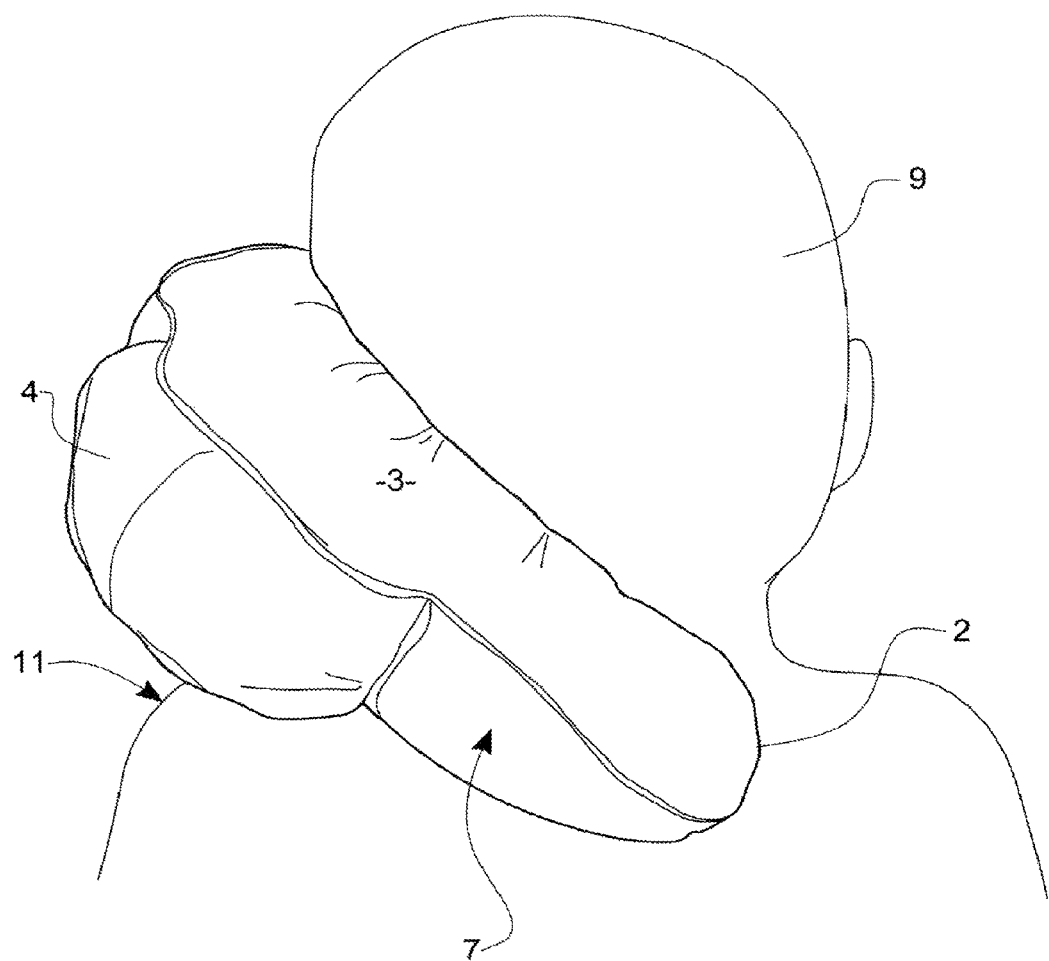
FIG. 7 illustrates a back view of the first use of the cushion of FIGS. 5 and 6.

FIGS. 5 to 7 illustrate the former support position of the cushion lodged over the shoulder (11) of a user in the chair (12) of a vehicle, wherein the head support panel (3) of the cushion portion (2) supports a side of a user's head (9) and the hooked trunk portion (4) hooks under the head to support the chin (10) of the user concurrently.

As shown in FIG. 5, in this use of the cushion the trunk portion (4) extends across the underside of the chin of the user of the cushion, to a point beyond the mid-point of the chin of the user. Thus, the trunk portion (4) provides support for substantially the whole of the underside of the chin of the user.

As shown in FIG. 6, in this use of the cushion the pillow portion (2) extends across substantially the whole of the side of the head of the user of the cushion, i.e. the pillow portion (2) extends from substantially the back of the head of the user to substantially the front of the head of the user, e.g. to a position just beyond the front of the face of the user. The ear of the user is completely covered by the pillow portion (2).

As shown in FIG. 7, in this use of the cushion the trunk portion (4) covers substantially the whole of the back of the neck of the user of the cushion, i.e. it extends from a left side of the back of the neck across and towards a right side of the back of the neck, so that the majority of the back of the neck from the left side to the right side is covered by the trunk portion (4).

Thus, the cushion simultaneously contacts and provides support for the back of the neck of the user, the side of the head of the user, and the underside of the chin of the user.

Figure 8:
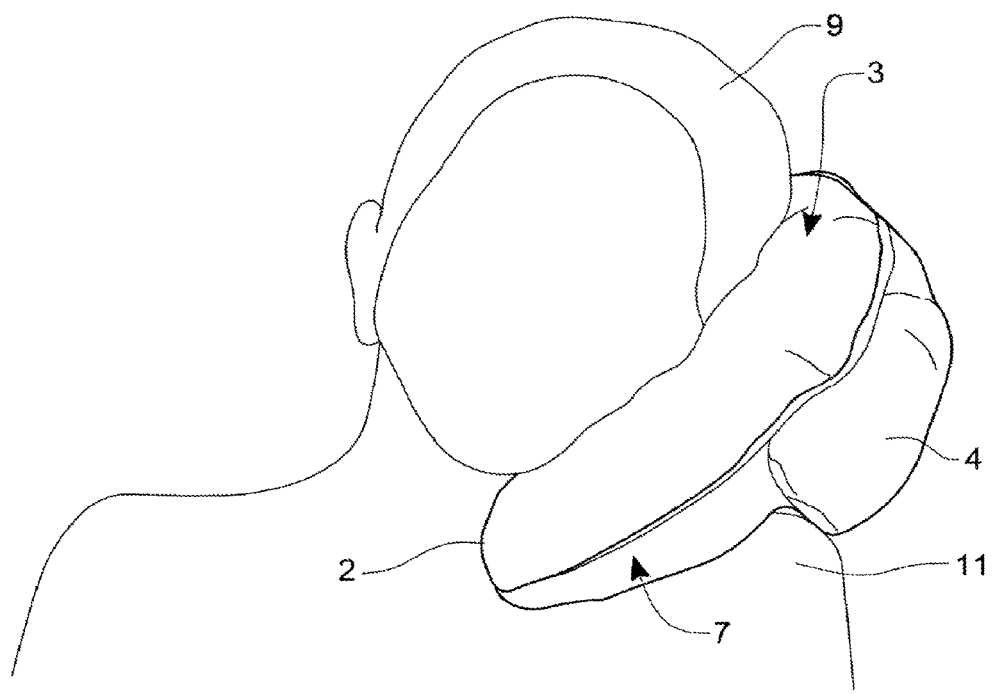
FIG. 8 illustrates a front view of a second use of the cushion of FIGS. 1 to 4.
Figure 9:
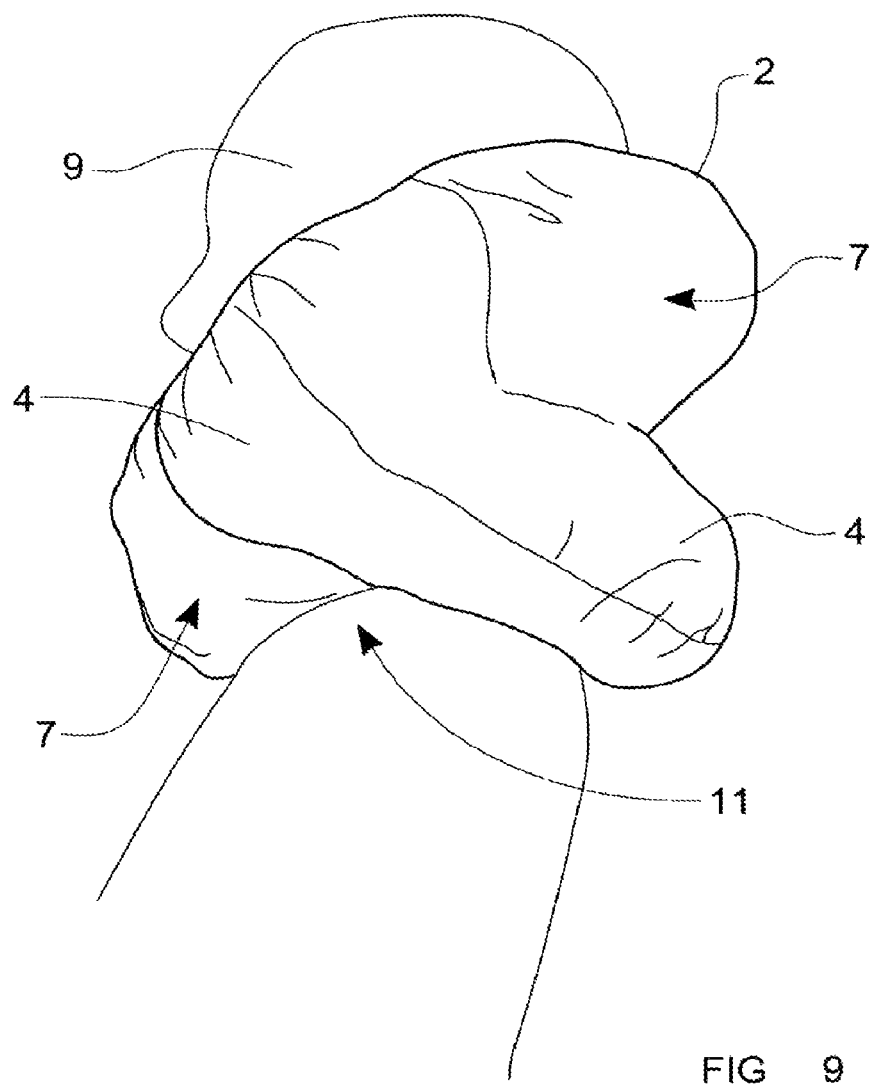
FIG. 9 illustrates a side view of the second use of the cushion of FIG. 8.
Figure 10:
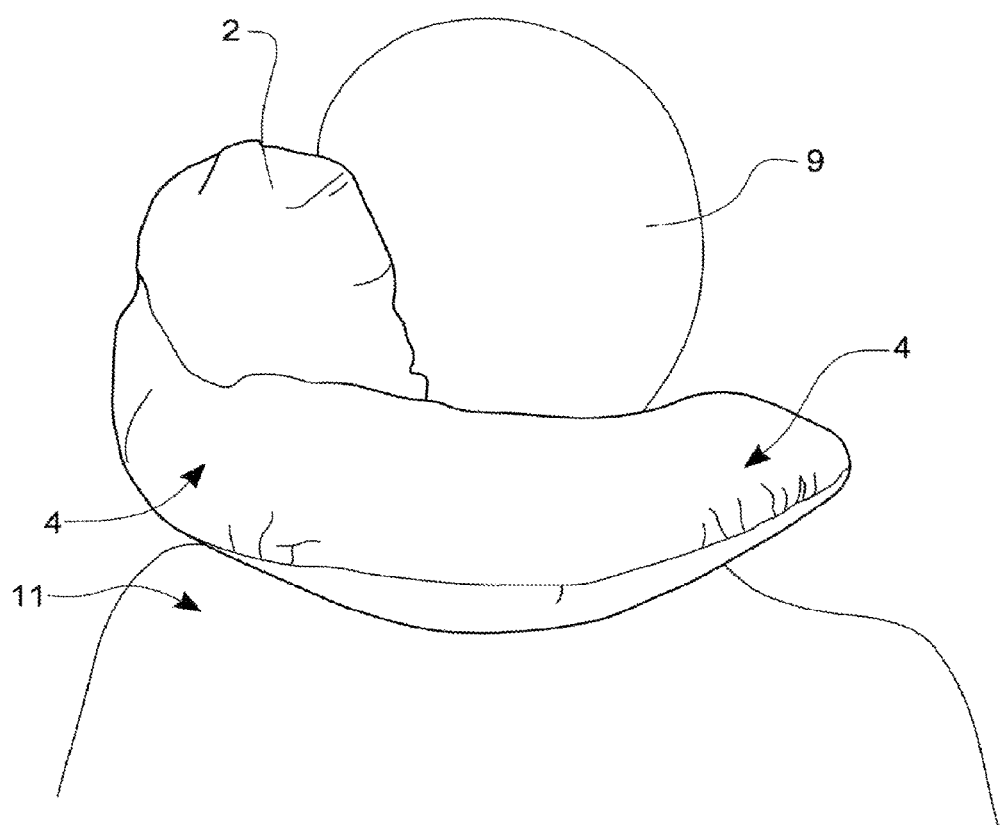
FIG. 10 illustrates a back view of the second use of the cushion of FIGS. 8 and 9.
Figure 11:
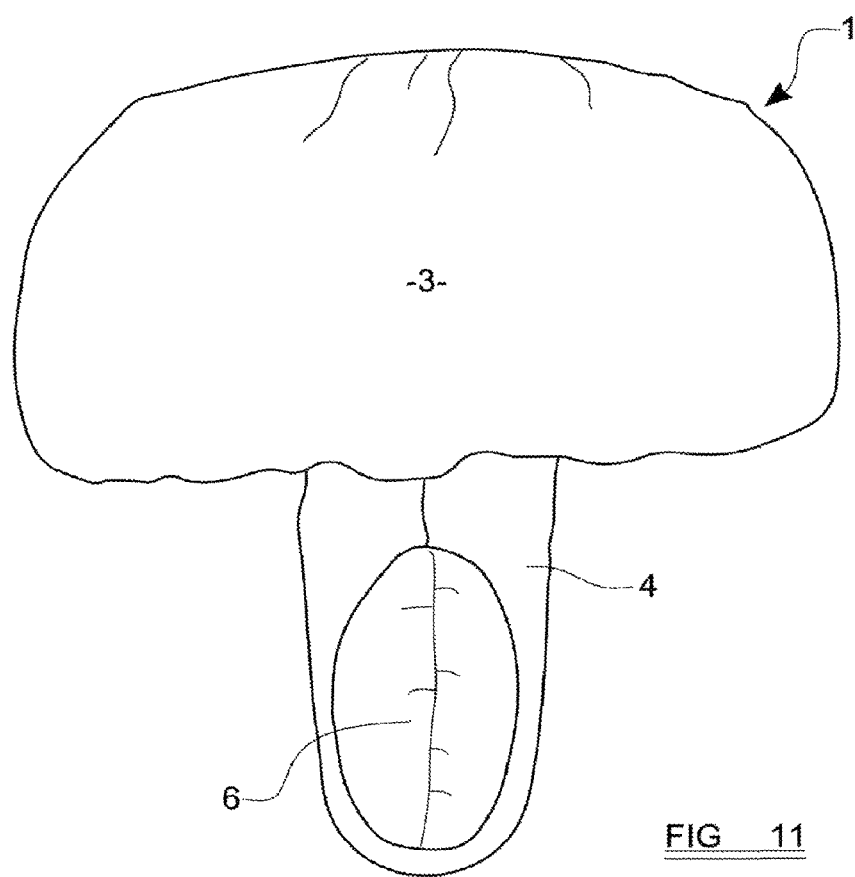
FIG. 11 illustrates a front view of an alternative shape of cushion in which the pillow portion has a slightly flattened upper peripheral edge.

FIGS. 8 to 10 illustrate the latter support position of the cushion lodged over the shoulder (11) of a user in the chair (not shown) of a vehicle, wherein the head support panel (3) of the cushion portion (2) supports a side of a user's head (9) and the hooked trunk portion (4) hooks under the head to support the nape of the neck (FIG. 10, rear view of user) of the user concurrently.

As with the previous support position, the cushion simultaneously contacts and provides support for the back of the neck of the user, the side of the head of the user, and the underside of the chin of the user.

The cushion comprises a cushion case formed from three pieces of fabric joined at two seams (8C, 8D FIGS. 1 to 3) which enclose an inner volume of the case filled with compliant stuffing material. The fabric may be any suitably strong and light fabric for a cushion case as would be readily available to the skilled person.

The exterior surface of the cushion could be made of fleece, cotton, denim etc. The back of it which will typically be resting against a support surface (e.g. a high back chair when in use) may have non slip material incorporated which may be important when used whilst in slippery leather chairs.

The compliant stuffing material may be, but is not limited to, any one or more of: memory foam, buck wheat, micro beads, or any other padding material. Two of the three pieces of fabric are shaped to be mirror images of each other and to provide opposite halves of the trunk portion and rear surface (7) of the pillow portion. They are joined at a single seam (8D) which runs along the length of the trunk potion bisecting it and the rear pillow surface (7). A third of the three pieces of fabric defines the head support panel and is joined to the other two pieces of fabric at a semicircular seem (8C) which circumscribes the pillow portion along its semi-circular peripheral edge.

Optionally, an internal fabric panel is provided which forms a partition between padding within the pillow portion and padding within the trunk portion. The internal panel may be joined by respective seams (8A, 8B) to the two fabric pieces defining the two halves of the rear pillow surface (7) symmetrically at opposite respective sides of the seam (8D) joining those two pieces wherein the respective seams extend from the semi-circular seam at the periphery of the pillow portion to the straight diametrical seam at the opposite periphery of the pillow portion, without connecting to the head support panel. This partitions the end of the trunk portion which joins the pillow portion, from the pillow portion it joins.

Figure 12:
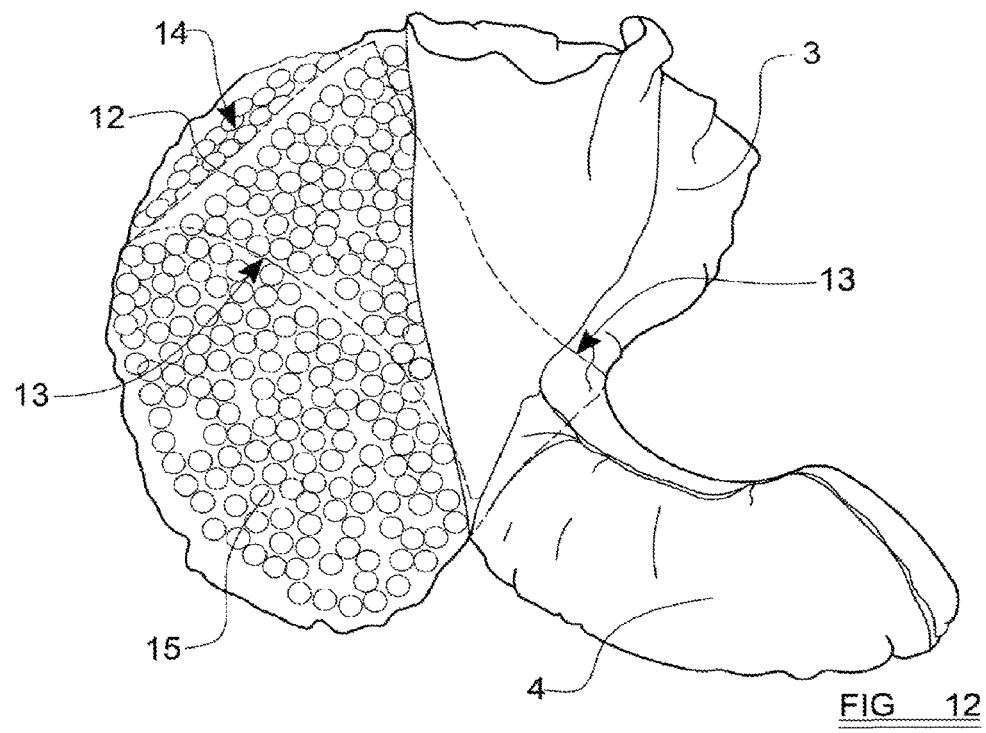
FIG. 12 illustrates a perspective view of a partially dissected cushion according to another embodiment of the invention in which there exists an internal partition panel separating the internal volume of the cushion in to two parts.

FIG. 12 illustrates a perspective view of a partially dissected cushion in which a part of the head support panel remains un-fixed to the pillow portion to reveal the internal partition panel (12). Dashed lines (13) identify the edges of the internal panel where it sown to the casing of the cushion to close-off the inner volume of the trunk portion from that of the pillow portion. The extreme peripheral edge of the internal panel is shown un-sown to the cushion casing, for clarity, to reveal some of the stuffing (14) held within the trunk portion. Stuffing (15) of the pillow portion is also shown. The internal panel and head support panel, once fully sown, cover and contain the stuffing, and the internal panel fully partitions the trunk stuffing from the pillow stuffing.

Figure 13:
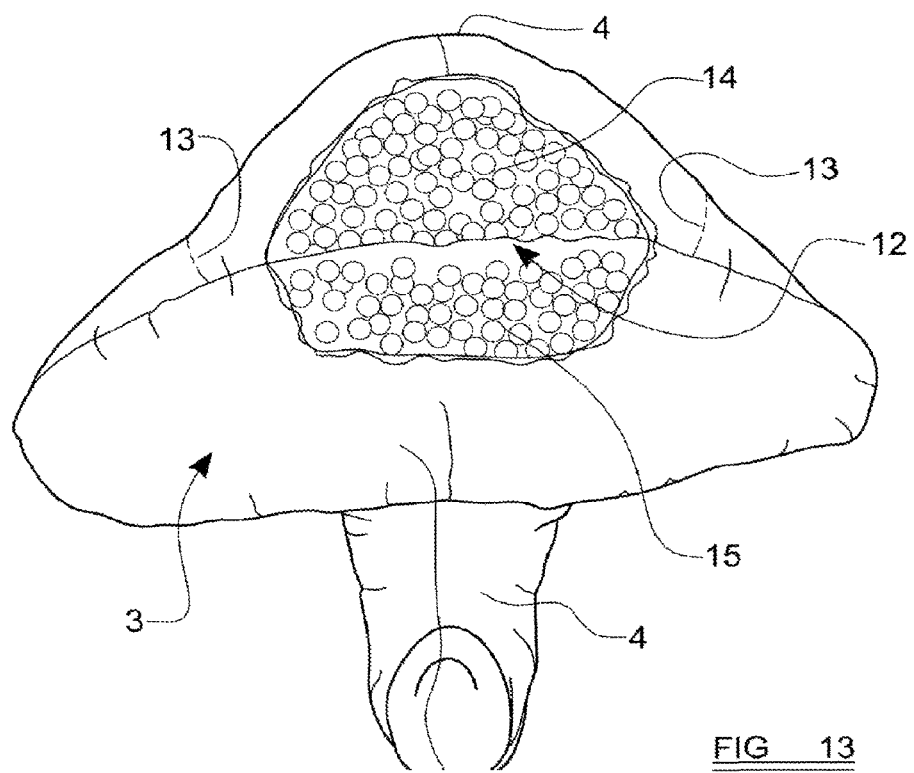
FIG. 13 shows a top view of the cushion of FIG. 12 with a top part artificially removed to reveal the internal panel and stuffing.

FIG. 13 shows a top view of the cushion of FIG. 12 with a top part artificially removed to reveal the internal panel and stuffing.

It has been found that providing the cushion with the panel partition tend to provide the following advantages.

The fabric panel partition creates two separate chambers—a trunk chamber, including the spine portion of the trunk extending along a surface of the pillow portion, and pillow chamber. When the chamber defining the spine is stuffed with appropriate padding material it desirably forms a strong and defined spine which maintains its shape (typically more so than does the cushion without the panel partition). This spine part of the trunk chamber confines the stuffing (micro beads, padding etc) to the trunk, the stuffing cannot disperse into the pillow chamber as would be possible were the partition absent. The absence of a panel may permit stuffing to be displaced after repeated use causing deformation and sagging.

When the cushion is used with the trunk placed under the user's chin, the arch of the trunk and one side of the pillow portion, slots over the arch of the shoulder and the centre area of the head support panel of the pillow portion forms a cushion for the side of the resting head. This is supported by the thick spine, which lies on top of the shoulder and underneath the pillow portion. The internal panel partition helps the spine maintain its strength and shape. In contrast, a cushion without the panel partition and therefore perhaps, over time, without such a well-defined spine, may not support the head as well as would the cushion having the partition. In such a case, potentially, the weight of the user's head may squash down the whole area putting strain on the neck. The squashiness of the cushion may worsen with repeated use.

The same principle applies when the cushion is used with trunk placed around the nape of the neck. Here, the arch formed by the trunk and the side of the pillow portion arches over the shoulder, with the pillow portion now diagonally in front of the shoulder. The thick spine lies on top of the shoulder again giving support to the pillow portion and the resting head.

Thus, provision of the internal panel partition forms two chambers. A spine chamber and a pillow portion chamber. The spine chamber may be stuffed to capacity so that it forms a thick spine (and trunk) extending out from the back of the pillow portion. The amount of padding and thickness of the spine does not interfere with the shape of the pillow portion chamber since it is partitioned from the latter. The pillow portion may be stuffed independently and may be filled so that the pillow portion is slightly concaved in shape (a bulging pillow portion may not be comfortable for the resting head). Conversely, with no panel partition to enhance the strength and support desirable at the back of the pillow, the whole area (back and front of the pillow portion) has to be filled. This may make the top part of the pillow more conical in shape and the pillow portion area may bulge out. This tends not to be as comfortable for a resting head.

In order to better be more comfortably accommodated either under the chin of a user or within the nape of the user's neck, the cross sectional profile of the trunk portion where the trunk is separate from the pillow portion, is generally oval with the long oval axis generally parallel to the local radius of curvature of the hook shape of the trunk there. The result is that the trunk is generally wider in the dimension adapted to extend under the chin of the user—to provide a support platform—than in the dimension adapted to extend down from the chin, where less space is generally available to accommodate it between the chin and the chest of the resting user.

The trunk is also tapered to narrow towards its terminal end.

Figure 14:
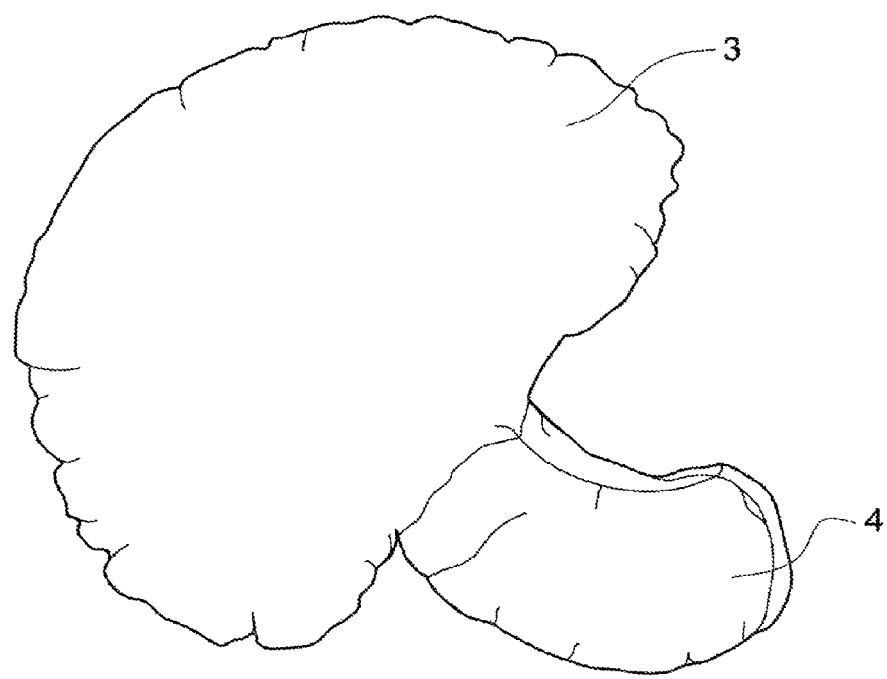
FIG. 14 shows a view of a cushion according to an embodiment of the invention in which the trunk portion is shorter than in other embodiments.

FIG. 14 shows a view of a cushion according to an embodiment of the invention in which the trunk portion is shorter than in other embodiments.

Figure 15A:
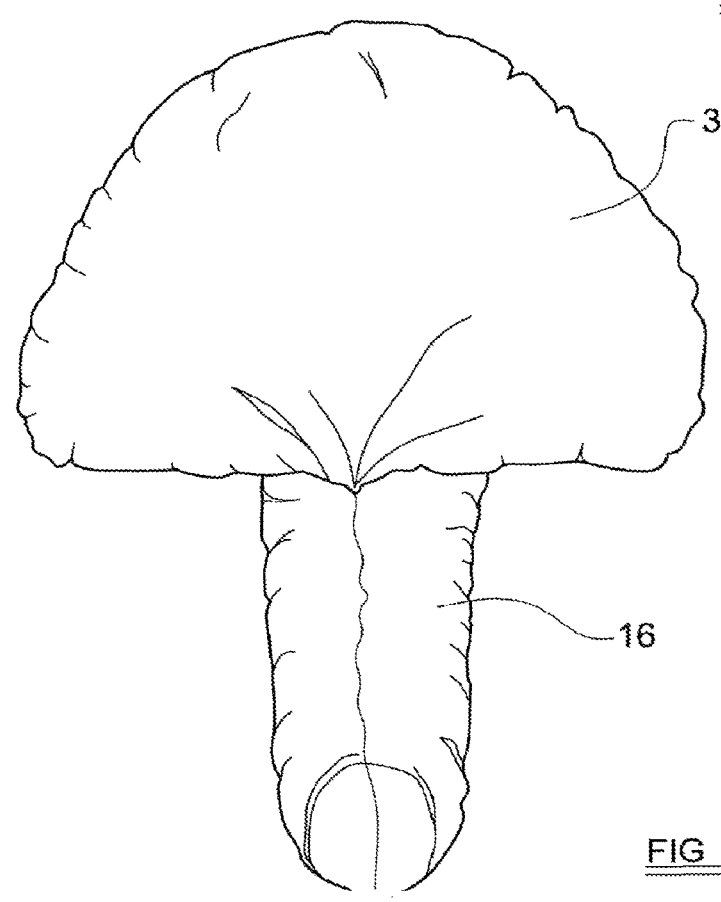
FIGS. 15A and 15B show top and side views of a cushion according to a further embodiment of the invention comprising a straight trunk portion which is adjustably deformable by the user to retain a bent shape.
Figure 15B:
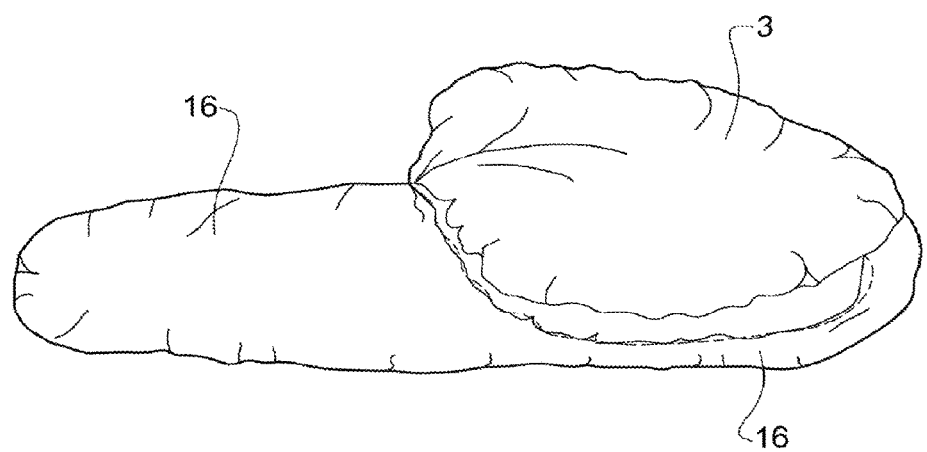

FIGS. 15A and 15B show top and side views of a cushion according to a further embodiment of the invention comprising a straight trunk portion (16) which is adjustably deformable by the user to retain a bent shape. Thus, the trunk portion may be adjustably bent by the user (e.g. become hooked), and to retain the bent shape. The cushion may be made and sold with a substantially straight trunk portion, which is adjustable to bend to suit the comfort of the user. A suitable foam or axial/longitudinal wire insert, such as would be apparent to those skilled in the art, may be housed in, and extend along, the trunk portion which serves to reversibly or adjustably retain a given shape to which the user deforms it in use. Such an insert may extend from the end of the trunk portion adjacent the pillow portion to the other terminal end (or thereabouts), and may extend along substantially the full length of the trunk portion from the one end of the cushion (or thereabouts) to the other.

Figure 16:
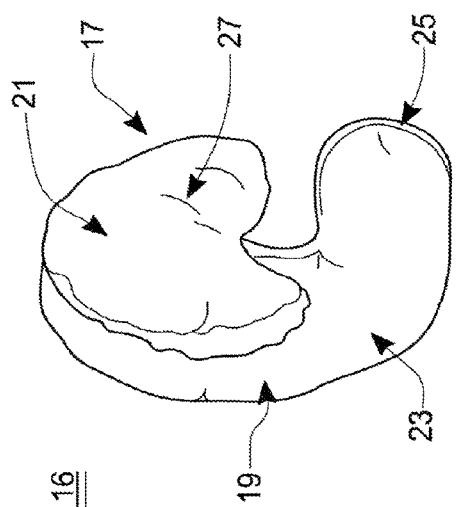

FIG. 16 illustrates an alternative cushion shape according to a preferred embodiment of the invention. In particular, the cushion (17) according to this embodiment comprises a trunk portion (19) which extends from the pillow portion (21) of the cushion (17) as a curved spine portion which executes a relatively sharp bend (23) of approximately or substantially 90° at a region of the trunk portion (19) between the pillow portion (21) and a terminal end (25) of the trunk portion (19). This substantially 90° bend (23) is executed over a limited region of the trunk portion (19) and those parts of the trunk portion (19) extending from the 90° bend region, to the terminal end of the trunk (25), are substantially straight in shape and form. The pillow portion (21) of the cushion (17) according to this preferred embodiment presents a generally convex head support surface (27) which generally bulges outwardly as a result of an appropriate amount of stuffing or padding material located underneath the head support surface (27) within the body of the pillow portion (21). The head support surface (27), and the pillow portion (21) itself, are generally crescent shaped.

Figure 17:
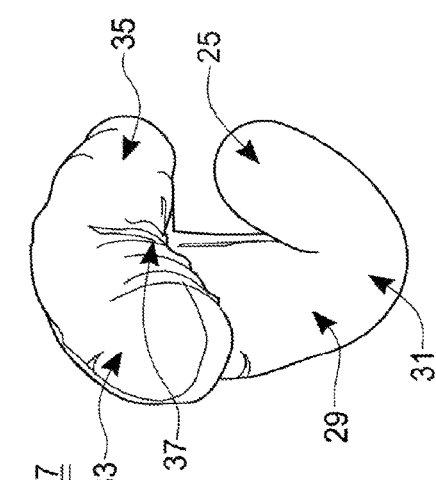
FIGS. 16 to 19 show perspective views of cushions according to further embodiments of the invention.

A further alternative preferred embodiment of the invention is illustrated in FIG. 17. In this embodiment the trunk portion (29) executes an acute bend (31) in which the two parts of the trunk portion (29) either side of the acute bend (31) subtend between them an acute angle (less than 90°). This acute angle bend (31) is executed over a relatively short region of the trunk portion (29) such that those parts of the trunk portion (29) extending from the pillow portion (33) towards the acute bend region (31) define a gently curving spine portion, and those parts of the trunk portion (29) extending from the acute bend region (31) to a terminal end (25) of the trunk portion (29) are generally straight, although a gentle curvature may be provided on the outwardly-presented (i.e. convex) surface portions of the trunk portion (29) in those regions from the acute bend part (31) to the terminal end part (25) of the trunk portion. Furthermore, the pillow portion (33) in this further preferred embodiment defines a concave head support surface (35) which presents to the user a recess (37) for receiving and supporting the user's head.

Those parts of the trunk portion (29) between the acute bend region (31) and the terminal end (25) of the trunk portion (29) extend in a generally linear direction which, if extended beyond the terminal end (25) of the trunk portion (29), passes over the concavity (37) of the head support surface (35) of the pillow portion (33) thereby to generally point towards the head of a user when located in the recess (37) of the head support surface (35) in use. This arrangement serves to more effectively nuzzle the end of the trunk portion (25) under the chin or around the back of the neck of the user when used.

Figure 18:
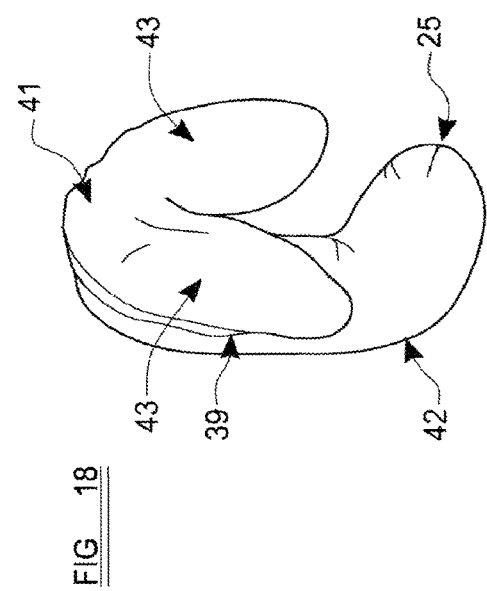
Figure 23:
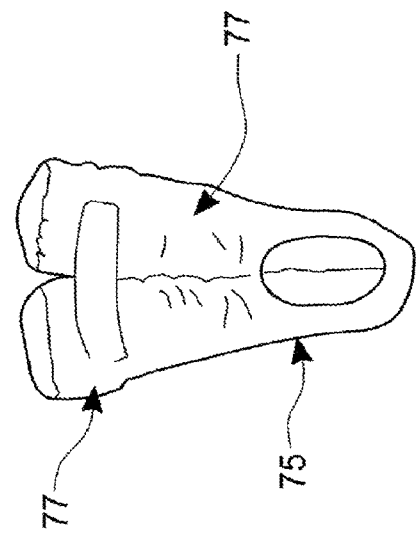
FIG. 23 show a front view of a cushion according to a further embodiment of the invention, wherein the cushion has fastening means so that the cushion can be secured in a folded configuration.

FIG. 18 illustrates another preferred embodiment of the invention in which the trunk portion (39) extends from the pillow portion (41) as a generally straight spine portion which executes an obtuse bend (42) from which the trunk portion (39) further extends to a terminal end (25) of the trunk portion (39) in a generally linear fashion. In this example, the angle subtended by the portions of the trunk, which meet at the obtuse bend (42), is greater than 90°. Furthermore, the pillow portion (41) in this preferred embodiment generally presents a "V" shape in which two lobes (43) of the pillow portion (41), which project laterally from the spine portion of the trunk portion (39), meet at an angle which is less than 180° such that the lobes (43) of the pillow portion (41) appear to "droop" in a direction towards the obtuse bend (42) in the trunk portion (39) of the cushion.

Figure 19:
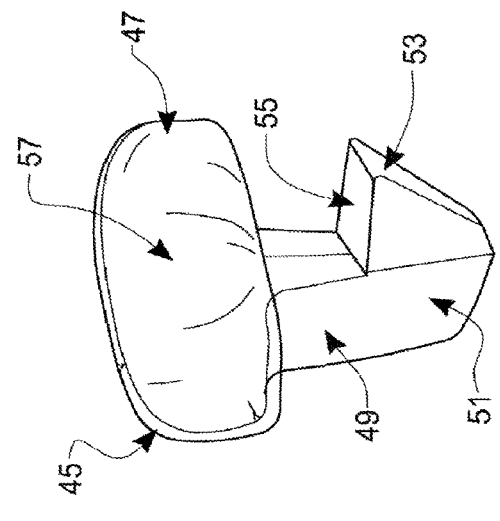

In a yet further preferred embodiment of the invention, illustrated in FIG. 19, the cushion (45) presents a generally oblong or rectangular-shaped pillow portion (47) from which extends a generally straight spine portion (49) which presents a bend (51) at its end, wherein the extreme end (53) of the trunk portion (49), following the bend (51), defines a shelf-like terminal surface (55) presenting a terminal surface generally facing in a direction extending towards or over the head support surface (57) of the pillow portion (47).

The embodiments of FIGS. 16 to 19 are examples showing the types of pillow portions and trunk portions encompassed by the present invention. Of course, different combinations of pillow and trunk portions are encompassed by the present invention than those illustrated in FIGS. 16 to 19. For example, the pillow portion of FIG. 16 could be combined with the trunk portion of FIG. 19. Alternatively the pillow portion of FIG. 17 could be combined with the trunk portion of FIG. 18, and so on.

FIGS. 20, 21 and 22 illustrate a yet further preferred embodiment of the invention which is applicable to any one, some or all of the alternative cushion shapes described herein, in which attachment apparatus (59) are fixed to the extreme ends of the pillow portion (61) of the cushion at opposite sides. In particular, referring to FIG. 20, a Velcro™ hook-bearing strap (63) is attached at a terminal end of the pillow portion (61) at one side, and upon a surface part of the pillow portion (61) from which the spine part of the trunk portion (65) of the cushion generally extends (i.e. the side reverse to the head support surface of the pillow portion). Correspondingly and generally symmetrically placed at the other terminal end of the pillow portion (61) at the opposite side is a hoop-bearing Velcro™ strip (67) adapted to receive a surface of the hook-bearing Velcro™ strip (63) so as to engage with and fasten to that strip in a manner as will be readily appreciated by the skilled person. A hoop (69) is formed at an edge of the pillow portion (61) mid way between the terminal ends of the pillow portion (61) on an edge of the pillow portion (61) opposite the edge from which the trunk portion (65) extends to form the aforementioned bend. The hoop (69) is provided so that the cushion can be attached to a user's luggage or other article when the cushion is not in use.

As shown in FIG. 21, by folding the extreme opposite ends of the pillow portion (61) towards one another in order to draw the hook-bearing Velcro™ strip (63) towards the loop-bearing surface of the loop-bearing Velcro™ strip (67), and concurrently folding the projecting part of the trunk portion (65) towards the pillow portion (61), the trunk portion (65) may be embraced by, and enveloped within, the two folded-over sides of the pillow portion (61) and the arrangement held in place by action of the hook-bearing and hoop-bearing Velcro™ strip portions (63, 67) fully engaged as shown in FIG. 22. In this way, the cushion may be compressed and rolled-up in order to reduce its size for packing within luggage of a traveller or user.

A small element (60) may be provided above the Velcro™ strip (63) to hide the Velcro™ strip (63) when it is not in use. This element (60) may be a loop bearing Velcro™ patch to which the Velcro™ strip (63) is connectable. Alternatively, it may be a small pouch, recess or opening in which the Velcro™ strip (63) can be stored.

In alternative embodiments, the Velcro™ strips may be replaced with other fastening means, for example by two or more magnets, which may be positioned in substantially the same positions as the Velcro™ strips described above or may be positioned in a different arrangement. Of course, other fastening means known to a person skilled in the art could be used in place of the Velcro™ strips, for example a toggle and loop arrangement, or one or more poppers.

FIGS. 23, 24, 25A and 25B show a further preferred embodiment of the invention employing the same principle as that shown in the embodiments of FIGS. 20 to 22. However, in this alternative embodiment of the invention, the pillow portion (71) presents a head support surface (73) which is generally more triangular in shape (approximately speaking, and in general terms) whereby the edges of the head support surface (73) at the side of the pillow portion (71) from which the trunk portion (75) extends meet at an apex which points towards the bent, projecting portion of the trunk at an angle less than 180°. Each of these two edges is substantially straight or gently curved to a small degree along its length between the apex in question and the outermost extreme end of the pillow portion (71) to which that edge extends. The uppermost edge of the pillow portion (71) joining the extreme ends of the pillow portion, at opposite sides, is also only mildly convexly curved or approximately straight to a large extent. This means that the two oppositely projecting lobes (77) of the pillow portion (71) extend from opposite sides of the trunk taper towards a roughly and approximately triangular point at the extreme respective end of the pillow portion (71). In this way, the pillow portion (71) is approximately triangular at its head support surface and tapers towards an approximately triangular apex at the trunk portion near-most the bend in the trunk.

Figure 24:
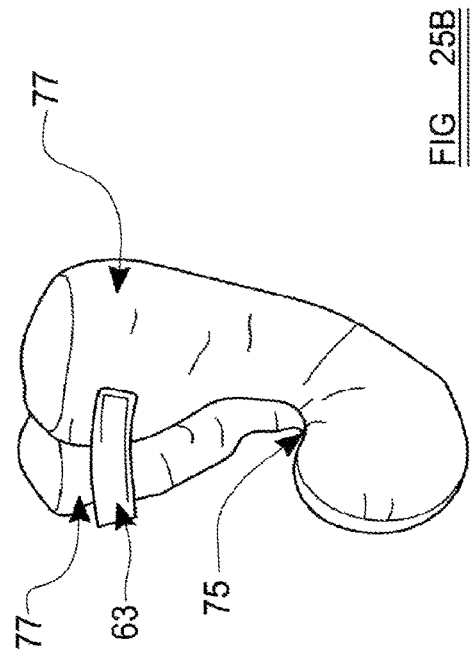
FIGS. 24 to 25B show front, side and perspective views of the cushion of FIG. 23, wherein the cushion has been secured in a folded configuration using the fastening means.

Consequently, when the two lobes (77) of the pillow portion (71) are folded towards each other, without a concurrent inward folding of the bent portion of the trunk portion (75), the two pillow portion lobes (77) may be caused to meet as shown in FIG. 24 so as to press respective parts of the head support surface in direct contact together and hold the lobes (77) of the pillow portion (71) in that state using the Velcro™ fasteners (63, 67) described above with reference to FIGS. 20 to 22. The Velcro™ fastener arrangement illustrated in FIGS. 23 to 25B is substantially the same as those shown in FIGS. 20 to 22.

Figure 25A:
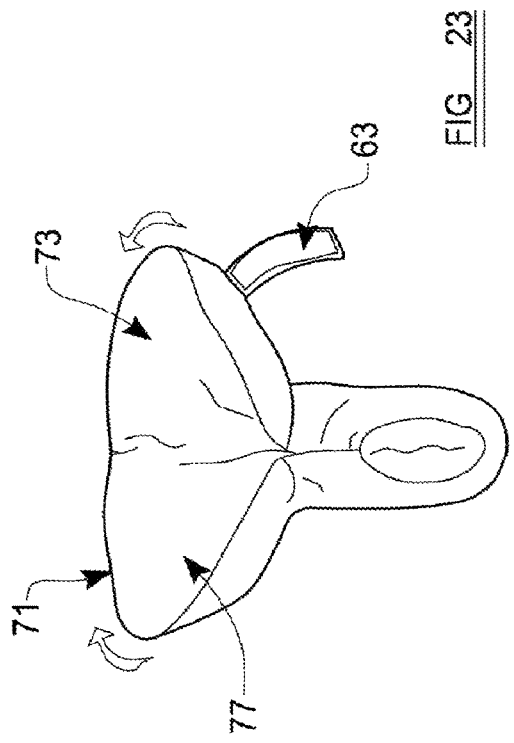
FIGS. 25C and 25D show perspective views of the cushion of FIGS. 23 to 25B being used to support the head of a person.
Figure 25B:
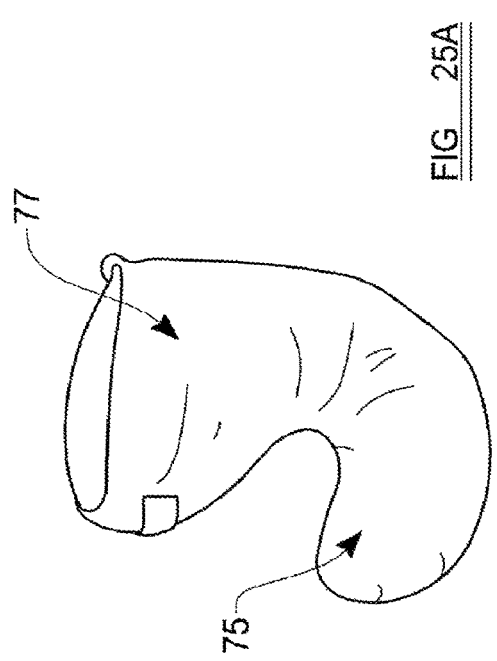
Figure 25D:
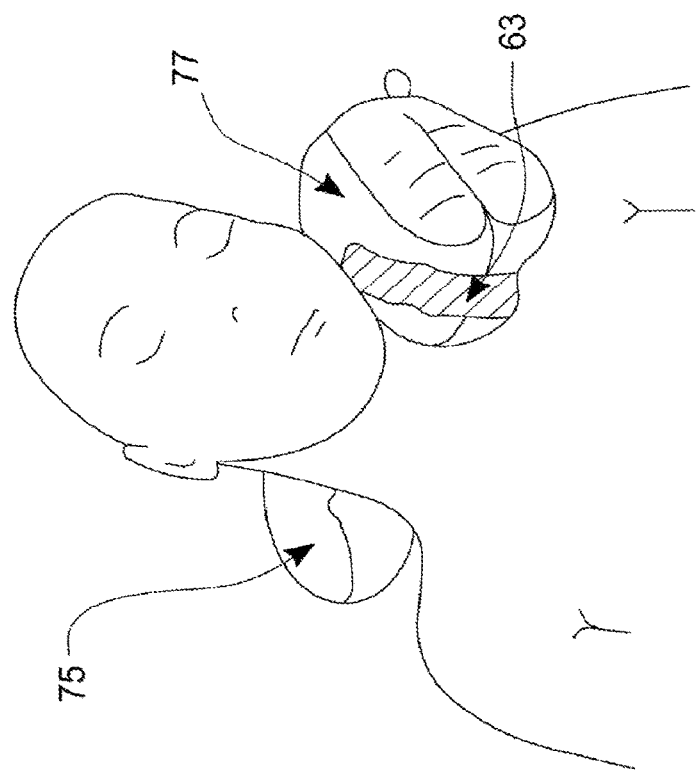
Figure 25C:
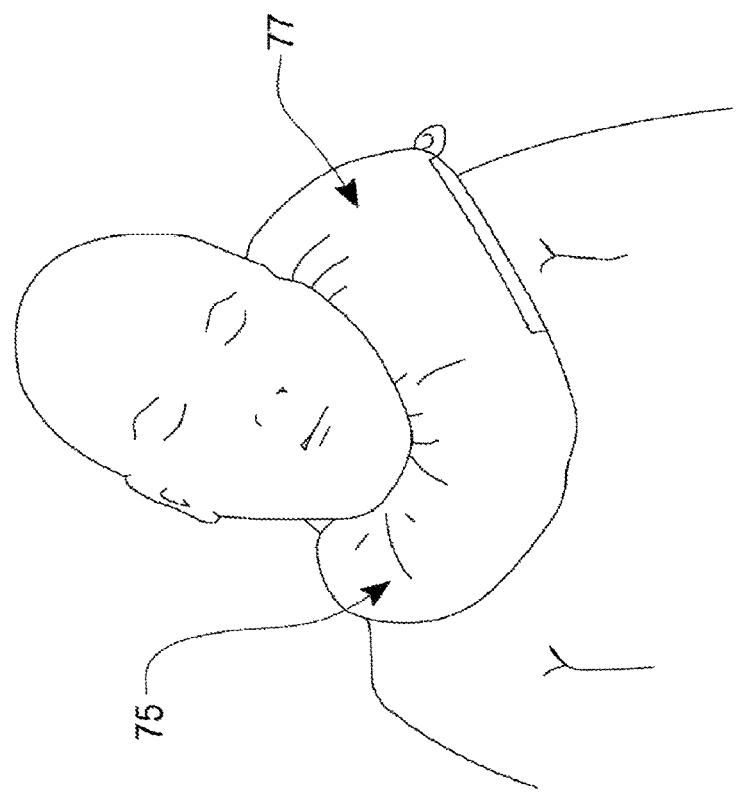

Consequently, with the two lobes (77) of the pillow portion (71) held together as shown in FIGS. 24, 25A and 25B, a new and useable pillow structure is provided as illustrated in FIGS. 25A and 25B in which the curved trunk (75) of the pillow continues to serve its original purpose, whereas the back surface of the pillow portion (71), previously not intended to be employed as a head support surface, may now be employed as a head support surface on either side of the closed pillow portion lobes (77). Examples of this new use of the cushion are illustrated in FIGS. 25C and 25D.

Figure 28A:
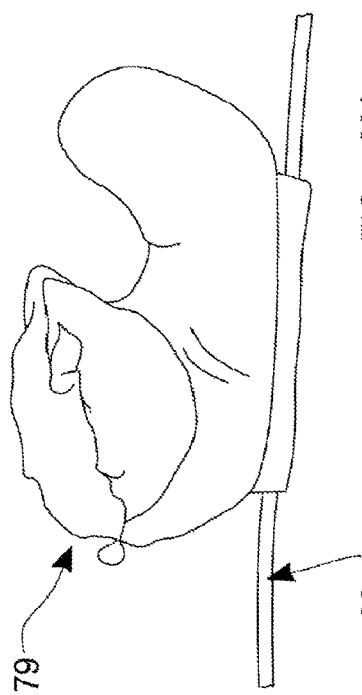
FIGS. 28A to 28C show side, rear and perspective views of the cushion of FIGS. 27A to 27B, wherein the cushion is attached to a seatbelt.
Figure 28B:
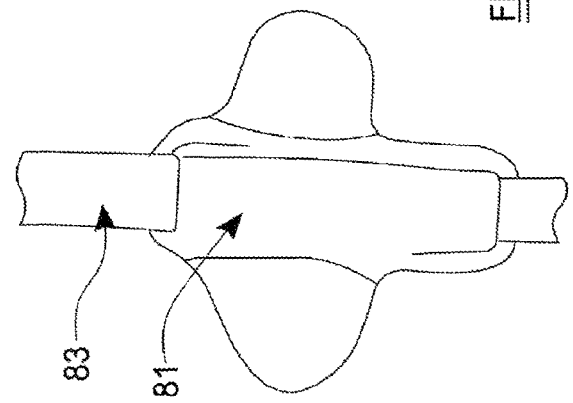
Figure 28C:
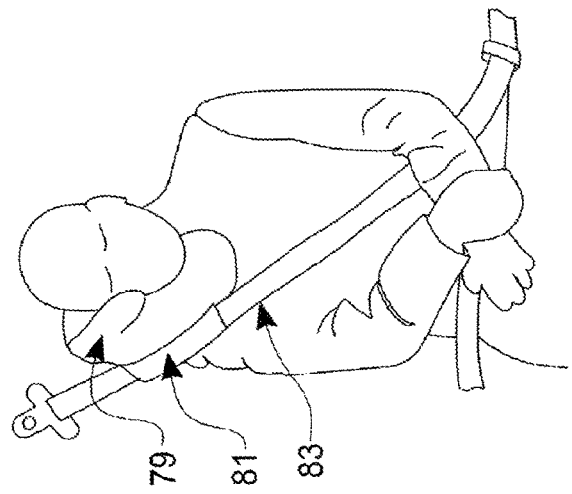

FIGS. 26A, 26B and 26C, and FIGS. 27A, 27B and 27C, and FIGS. 28A, 28B and 28C show a further preferred embodiment of the present invention in which the cushion (79) includes an attachment apparatus (81) for use in attaching the cushion (79) to an elongate support structure (83) such as a support pole or a seatbelt strap. FIGS. 26A to 26C illustrate use of the attachment apparatus (81) in attaching the cushion (79) to a support pole (83), whereas FIGS. 28A to 28C illustrate use of the attachment apparatus in attaching the cushion to the strap of a seatbelt in use.

Referring to FIGS. 27A to 27C, the cushion (81) comprises a first attachment panel (85) being a generally elongate panel attached at one elongate panel edge to the elongate spine portion of the trunk running in parallel to the spine at one side of the spine. One surface of the first panel has attached to it a strip (87) of hook-bearing Velcro™ material which extends along the elongate length of the first panel (85). Similarly, a second panel (89) is provided as an elongate structure attached to the spine of the cushion (81) in register with the first panel at a side of the spine opposite to the side of the spine to which the first panel (85) is concurrently attached. In addition, a strip (91) of loop-bearing Velcro™ material is attached to one side of the second panel (89) so as to be positionable, by appropriately positioning the second pane (89), to engage with the hook-bearing Velcro™ strip (87) upon the first panel (85) when the first panel (85) is similarly appropriately positioned concurrently. The second panel portion (89) is adapted to be folded over the centre of the spine along those parts of the spine adjacent the elongate edge of the second strip which is joined to the spine at its side, and, subsequently, the first panel (85) is adapted to be similarly folded over that same portion of the spine such that the outwardly-presented loop-bearing Velcro™ strip (87) upon the second panel (85) engaged with the hook-bearing Velcro™ strip (91) upon the first panel (89) in order to connect with and attach together. In this way, the first (85) and second (89) panels may embrace and envelop an elongate object (83) between them and the portion of the spine they cover when folded over as shown in FIGS. 27B and 27C.

The enveloped and embraced elongate object (83) may be held and gripped in position in this way. In a first example, illustrated in FIGS. 26A, 26B and 26C, the elongate object (83) is a flexible pole which may be of a suitably flexible material to permit the user to flex the pole to adapt, to some extent, the contort of the user's body, without being so flexible as to be easily collapsed. The pole may be substantially cylindrical in its elongate length. The support pole may be sufficiently long to extend from the cushion (81) along the torso of the user's body and to the legs of the user's body when seated. In this way, the user may embrace, with his/her arms the mid region of the support pole and embrace the lower terminal end of the support pole between his/her thighs in order to assist in retaining the cushion in place at one side of the user's head as shown in FIG. 26C.

In an alternative use, the elongate structure (83) embraced by the panels (85, 89) of the attachment apparatus may be a diagonal strap of a seatbelt of a user seated in a car or other vehicle employing such diagonal seatbelt straps which extend across the shoulder of a user, across their torso and down to the hip of the user at the opposite side of their body as shown schematically in FIG. 28C. Once more, the diagonal strap of the seatbelt is able to retain the cushion at the side of the user's head in use as shown in FIGS. 28A to 28C.

Alternative attachment means for attaching a cushion according to any one of the previously described embodiments to an article, such as a seatbelt, is illustrated in FIGS. 29A to 32.

The attachment means includes a panel structure (101) that can be folded to produce a tubular structure or sleeve for positioning around an article, such as a seatbelt. As shown in FIG. 29A, the panel (101) of this embodiment has four fastening means (103) positioned towards the corners of the panel (101). Two of these fastening means are positioned on a first side of the panel (101) and two are positioned on a second opposite side of the panel (101). The fastening means comprise hook-bearing Velcro™ patches or strips (105) positioned on the first side of the panel and corresponding hoop-bearing Velcro™ patches or strips (107) positioned on the second side of the panel.

As shown in FIG. 29B, the panel (101) can be positioned against a first side of a seatbelt (109). A first part (111) of the panel having the hoop-bearing Velcro™ patches or strips can then be folded over the seatbelt (109) to cover a second side of the seat belt (109). Then, as shown in FIG. 29C, a second part (113) of the panel (101) having the hook-bearing Velcro™ patches or strips (105) can then be folded over the seatbelt (109) to cover the second side of the seatbelt (109) and to overlap the first part (111) of the panel (101). As shown in FIG. 29B, the hook-bearing Velcro™ patches or strips (105) are positioned so that when the second part (113) of the panel (101) is folded over to overlap the first part (111) of the panel (101) the hook-bearing Velcro™ patches or strips (105) overlap and contact the hoop-bearing Velcro™ patches or strips (107). Thus, the panel is securely fastened in a sleeve/tube configuration around the seatbelt (109), as illustrated in FIG. 29C.

Of course, other arrangements of Velcro™ patches or strips, or other fastening means such as would be known to a person skilled in the art, could be used to secure the panel (101) around the seatbelt (109) in the sleeve/tube configuration.

As shown in FIG. 29C, the panel (101) has a large hook-bearing Velcro™ strip (115) on a surface thereof, such that when the panel (101) is formed as a sleeve/tube around the seatbelt (109) the large hook-bearing Velcro™ strip (115) is visible and presented on an external surface of the sleeve. As described later, this large hook-bearing Velcro™ strip (115) is used to secure the cushion to the sleeve. Of course, a plurality of smaller Velcro™ patches, or other fastening means, could be used in place of the large Velcro™ strip (115).

Thus, as shown in FIG. 30, the panel (101) can be formed into a sleeve around the seatbelt (109). The sleeve may be movable along the seatbelt (109) by a user, e.g. by sliding it along the seatbelt (109). Alternatively, the sleeve may tightly grip the seatbelt (109) so that it remains substantially in position on the seatbelt (109).

Figure 31B:
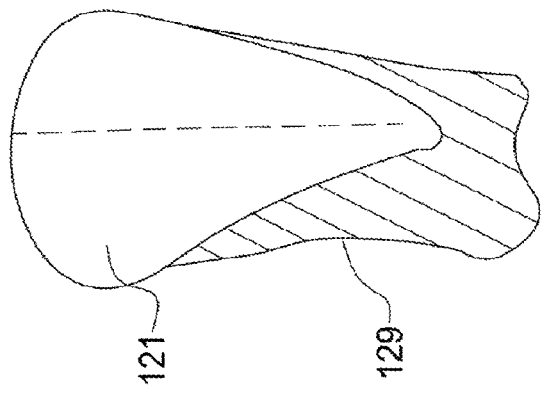
FIG. 31B shows a front view of the trunk sleeve shown in FIG. 31A after it has been constructed.
Figure 31A:
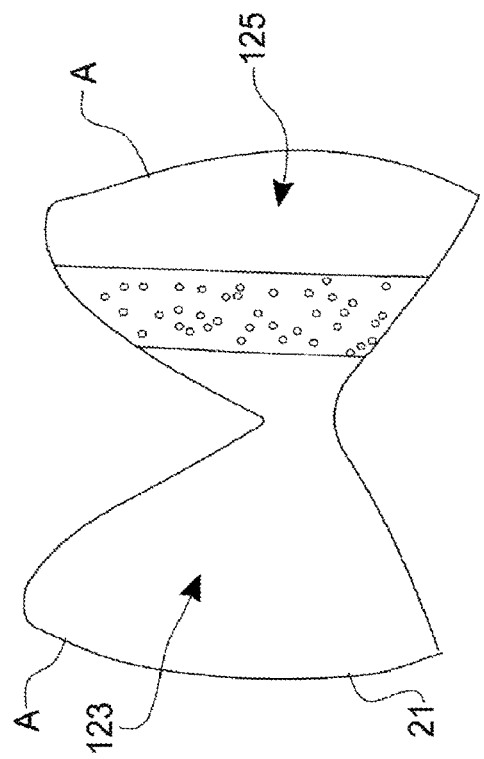
FIG. 31A shows a front view of a trunk sleeve according to a further embodiment of the invention, before it has been constructed.

As shown in FIG. 31A, a second part of the attachment means includes a panel structure (121) that can be folded to produce a removable tubular sleeve that can be positioned around the trunk of a cushion according to any one of the previously described embodiments. As shown in FIG. 31A, the panel (121) has corresponding first (123) and second (125) parts. A large hoop-bearing Velcro™ strip (127) is formed on the second part (125) of the panel (121). This hoop-bearing Velcro™ strip is for engaging and fastening to the large hook-bearing Velcro™ strip (115) on the seatbelt sleeve portion.

The panel (121) is formed into a tubular sleeve (129) by folding the panel structure so that the first (123) and second (125) parts overlap (with the Velcro™ strip (127) on the outer side) and securing the first (123) and second (125) parts together along the edges (A). For example, the edges (A) can be sewn together. Thus, a sleeve (129) is formed with a hoop-bearing Velcro™ strip on the external surface thereof. The completed sleeve (129) is shown in FIG. 31B.

Figure 32:
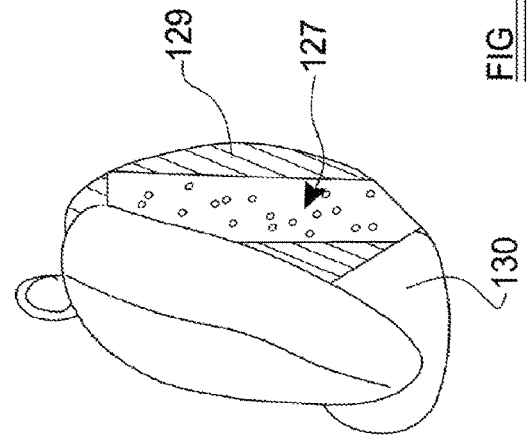
FIG. 32 shows a side view of the trunk sleeve shown in FIGS. 31A and 31B positioned around the trunk of a cushion according to one of the previous embodiments.

As shown in FIG. 32, the completed sleeve (129) can be positioned over the trunk portion (130) of a cushion according to any one of the previously described embodiments. This may be achieved by sliding the sleeve (129) along the trunk (130) of the cushion. As shown in FIG. 32, the hoop-bearing Velcro™ strip (127) is positioned on the outside of the sleeve (127), and towards a side of the trunk portion (130), i.e. away from a centre line of the trunk portion (130). The sleeve (127) is pulled up over the trunk portion (130) of the cushion so that it covers the majority of the back of the spine, coming down under the sides of the pillow portion and to the front of the pillow to the area where the top of the trunk joins the pillow portion.

A second hoop-bearing Velcro™ strip is positioned on a second side of the panel 121, directly opposite to and overlapping the hoop-bearing Velcro™ strip 127 (not visible in the Figures). Thus, the sleeve (129) can be turned inside out, so that it is usable on both seatbelts that extend across the body from the left of the body and on seatbelts that extend across the body from the right of the body, i.e. the sleeve (129) can be used with seatbelts that fasten either way.

Figure 35A:
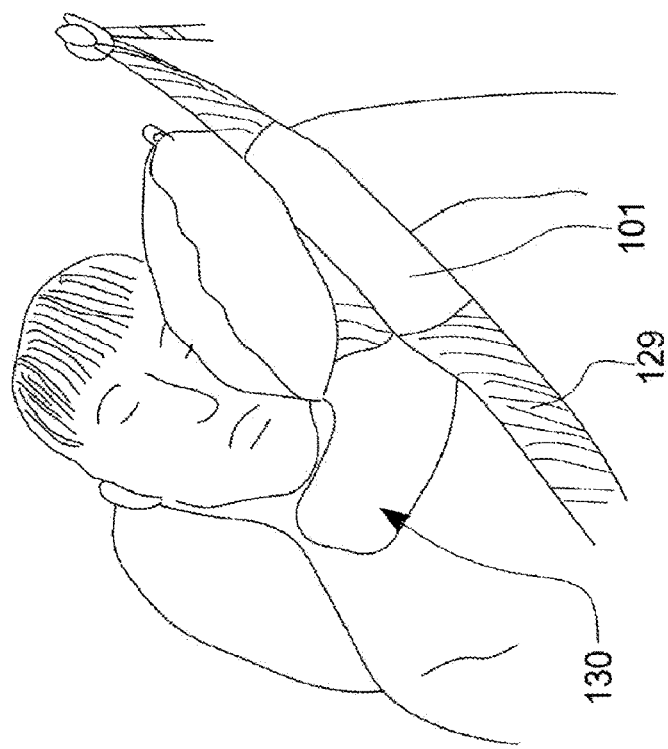
FIGS. 35A and 35B show front views of a cushion according to one of the previous embodiments including the sleeve trunk shown in FIGS. 29A to 32.
Figure 35B:
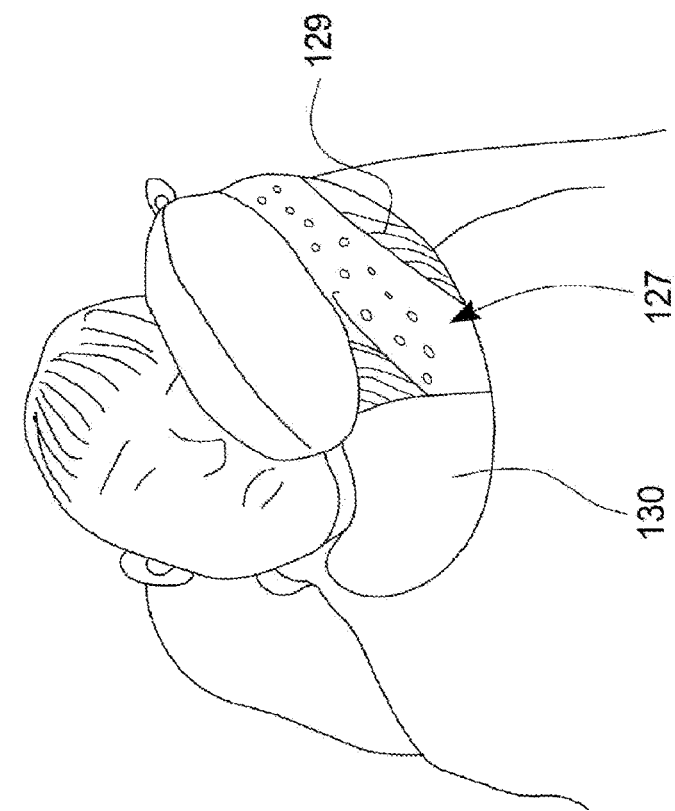

The combination of both parts of the attachment means in use is shown in FIGS. 35A and 35B. As shown in these Figures, the sleeve (129) is positioned about the trunk portion (130) with the hoop-bearing Velcro™ strip visible and positioned to one side of the trunk portion (130). The panel (101) is formed into a sleeve about the seatbelt (129) and is positioned so that the hook-bearing Velcro™ strip (115) on the panel (101) is in contact with and secured to the hoop-bearing Velcro™ strip (127) on the sleeve (129). Thus, the cushion is connected to/secured to the seatbelt (129) through the sleeve (129) about the trunk portion (130) and the sleeve about the seatbelt (129). As mentioned above, when it is desired to use the cushion with a seatbelt that fastens in the opposite manner, the sleeve (129) can be turned inside out before being positioned on the trunk portion (130).

The advantages of having the Velcro™ panel on the removable sleeve (129) as opposed to on the back of the trunk portion (129) as shown in FIGS. 28A, B and C is that the seatbelt rests better along the side of the pillow's spine, there is more flexibility in terms of repositioning the pillow until you get just the right angle, and the sleeve can be removed when the pillow is not in use with a seatbelt.

An alternative embodiment of the cushion is shown in FIGS. 33A to 34. This embodiment of the pillow is intended for use particularly as a kid's pillow, for use by children, but is not limited to use in this way. As shown in FIG. 33A, the cushion (141) of this embodiment has a different shape pillow portion (143) to some of the previously described embodiments. In particular, the pillow portion (143) is approximately U-shaped when viewed from the front, with extended ear portions (145) that extend from the pillow portion (143) towards a terminal end of the trunk portion (147).

Thus, the pillow portion (143) may be larger than the pillow portions of some of the previous embodiments, to provide a large pillow portion (143) for a child to rest their head on. The extended ear portions (145) are useable to cover more area at the back of the head or neck of the user and the trunk portion (147) is configured so that it is usable to curl further around a child's neck or chin.

As shown in FIGS. 33B and 33C, the centre part of the pillow portion (143) forms a distinct arch shape (149) above the trunk portion (147). This arch shape (149) allows the cushion to 'hook' more around the neck of a child in use, which will help keep it more in place.

As shown in FIG. 34, when the pillow sides (145) are folded together to form an alternative shaped pillow portion for a child to use, another arch is formed in the middle so that it will slot in comfortably around the child's neck.

When the cushion is used so that the trunk portion (147) is placed under the chin, children find it tricky to keep the pillow in place. Thus, the pillow of this embodiment is preferably used with the seatbelt attachment means described above, so that the cushion can be secured in place relative to the user and form an effective cushion for the user's head.

It is to be understood that the embodiment described above is intended to provide one an illustrative but non-limiting example of an implementation of the invention, and that modifications, variations and equivalents to elements of the above, such as would be readily apparent to the skilled user, are encompassed within the scope of the invention e.g. as defined by the claims.

I claim:

1. A cushion comprising:
   a pillow portion having a front side and an oppositely-directed rear side, said pillow portion having a support surface on said front side, said front side being concave in a rest shape of the pillow portion so as to provide a user with a recess for receiving and supporting a head of the user; and
   an elongate trunk portion extending away from said pillow portion, said elongate trunk portion having a terminal end that is distal to said pillow portion, said elongate trunk portion having a region that is proximal to said pillow portion, said elongate trunk portion having a frontwardly hooked configuration such that said terminal end is located frontwardly of said region.

2. The cushion of claim 1, wherein said elongate trunk portion is adapted to contact an underside of a chin of a user whose head is being supported by said pillow portion.

3. The cushion of claim 1, wherein said pillow portion projects from said elongate trunk portion transversely to an elongation of said elongate trunk portion.

4. The cushion of claim 1, wherein said pillow portion projects from said elongate trunk portion transversely to an elongation of said elongate trunk portion from two opposite sides of said elongate trunk portion.

5. The cushion of claim 1, further comprising: a recess adapted to engage a shoulder of a user whose head is being supported by said pillow portion.

6. The cushion of claim 5, wherein said recess is defined by a joint between said elongate trunk portion and a periphery of said pillow portion.

7. The cushion of claim 1, wherein said elongate trunk portion tapers towards said terminal end.

8. The cushion of claim 1, wherein the cushion is substantially symmetrical so that said pillow portion is adapted to support the head of a user from either side of the head of the user.

9. The cushion of claim 8, wherein the cushion is substantially symmetrical about a plane bisecting said pillow portion and containing said elongate trunk portion.

10. The cushion of claim 1, wherein said elongate trunk portion extends away from said rear side of said pillow portion.

11. The cushion of claim 1, wherein said elongate trunk portion emerges from said rear side of said pillow portion as a spine extending across said rear side of said pillow portion.

12. The cushion of claim 1, wherein said elongate trunk portion defines a resiliently compliant bend.

13. The cushion of claim 1, wherein said elongate trunk portion is adapted to extend across an underside of a chin of the user whose head is being supported by said pillow portion.

14. The cushion of claim 1, further comprising: an internal partition part separating an inner volume of said pillow portion from an inner volume of said elongate trunk portion.

15. The cushion of claim 1, wherein said elongate trunk portion is formed with a bend in a part of an elongate length thereof, wherein a degree of the bend at said part is greater than any degree of the bend formed elsewhere in said elongate trunk portion.

16. The cushion of claim 1, further comprising: two or more fasteners that are fastenable together to retain said pillow portion in a folded state.

17. The cushion of claim 1, wherein said elongate trunk portion is adjustably deformable by the user to form a curve or bend in said elongate trunk portion in which the curve or bend is substantially maintained after the deformation.

18. The cushion of claim 1, further comprising: a slip-resistant material formed at a part of an exterior surface thereof.

19. The cushion of claim 1, wherein said pillow portion is defined by a lateral expansion formed at one end of said elongate trunk portion which projects from said elongate trunk portion so as to extend transversely to opposite sides of said elongate trunk portion to present a terminal surface defining said support surface adjacent to said elongate trunk portion.

20. The cushion of claim 19, wherein said pillow portion projects from said elongate trunk portion such that said support surface extends in a direction generally transverse to an elongation of said elongate trunk portion and the elongation of the elongate trunk portion bends in a direction generally transverse to said support surface thereby to position said terminal end of said elongate trunk portion adjacent to said support surface.

21. The cushion of claim 1, wherein said elongate trunk portion defines a bend which is substantially continuously curved along an elongate length of said elongate trunk portion.

22. The cushion of claim 1, further comprising: a cushion case stuffed or filled with a compliant material.

23. An inflatable cushion comprising a cushion case which is inflatable to define a cushion according to claim 1.

24. The cushion of claim 1, wherein said pillow portion is wider than said elongate trunk portion.

* * * * *